United States Patent
Wang et al.

(10) Patent No.: US 12,168,951 B2
(45) Date of Patent: Dec. 17, 2024

(54) SYSTEMS AND METHODS FOR SELECTIVE CATALYTIC REDUCTION AND/OR AMMONIA SLIP CATALYST SULFUR PROTECTION

(71) Applicant: Cummins Inc., Columbus, IN (US)

(72) Inventors: Di Wang, Columbus, IN (US); Richard J. Ancimer, Toronto (CA); Michael J. Cunningham, Columbus, IN (US); Aleksey Yezerets, Columbus, IN (US); Jinyong Luo, Columbus, IN (US); Yadan Tang, Columbus, IN (US); Yuhui Zha, Columbus, IN (US)

(73) Assignee: Cummins Inc., Columbus, IN (US)

( * ) Notice: Subject to any disclaimer, the term of this patent is extended or adjusted under 35 U.S.C. 154(b) by 26 days.

(21) Appl. No.: 17/235,684

(22) Filed: Apr. 20, 2021

(65) Prior Publication Data

US 2021/0324775 A1     Oct. 21, 2021

Related U.S. Application Data

(60) Provisional application No. 63/013,292, filed on Apr. 21, 2020.

(51) Int. Cl.
*F01N 3/20* (2006.01)
*B01J 23/72* (2006.01)
(Continued)

(52) U.S. Cl.
CPC .............. *F01N 3/208* (2013.01); *B01J 23/72* (2013.01); *B01J 37/08* (2013.01); *F01N 3/0885* (2013.01);
(Continued)

(58) Field of Classification Search
CPC ..... B01J 23/72; B01J 37/08; F01N 2510/063; F01N 2570/14; F01N 2570/18;
(Continued)

(56) References Cited

U.S. PATENT DOCUMENTS

| | | | |
|---|---|---|---|
| 10,179,328 B2 | 1/2019 | Liu et al. | |
| 2014/0237996 A1* | 8/2014 | Yezerets | ................. F01N 3/208 |
| | | | 502/54 |

(Continued)

FOREIGN PATENT DOCUMENTS

| CN | 105709813 A | 6/2016 |
|---|---|---|
| CN | 106401704 A | 2/2017 |
| WO | WO-2018/172940 | 9/2018 |

OTHER PUBLICATIONS

Luo et al., "Identification of Two Types of Cu Sites in Cu/SSZ-13 and Their Unique Responses to Hydrothermal Aging and Sulfur Poisoning", Dec. 30, 2015, pp. 1-7.
(Continued)

*Primary Examiner* — Phutthiwat Wongwian
*Assistant Examiner* — Diem T Tran
(74) *Attorney, Agent, or Firm* — Foley & Lardner LLP

(57) ABSTRACT

Systems, apparatuses, and methods include predicting a sulfur exposure of one or more copper-zeolite catalysts deployed in an exhaust aftertreatment system; comparing the predicted sulfur exposure to a predefined sulfur exposure threshold; and responsive to the determination, heating the exhaust aftertreatment catalyst to a predefined heat treatment temperature for a predefined time period to desulfate the one or more copper-zeolite catalysts.

10 Claims, 10 Drawing Sheets

(51) Int. Cl.
*B01J 37/08* (2006.01)
*F01N 3/08* (2006.01)

(52) U.S. Cl.
CPC .... *F01N 2510/063* (2013.01); *F01N 2570/14* (2013.01); *F01N 2570/18* (2013.01); *F01N 2610/03* (2013.01)

(58) Field of Classification Search
CPC ......... F01N 2610/03; F01N 2900/1612; F01N 3/0814; F01N 3/0842; F01N 3/0885; F01N 3/208; Y02A 50/20; Y02T 10/12
See application file for complete search history.

(56) References Cited

U.S. PATENT DOCUMENTS

| | | | |
|---|---|---|---|
| 2015/0151251 A1* | 6/2015 | Gaudin | B01D 53/9431 423/212 |
| 2019/0083967 A1 | 3/2019 | Yang et al. | |
| 2019/0101034 A1* | 4/2019 | Mital | F01N 3/105 |
| 2020/0291838 A1* | 9/2020 | Lambert | F02D 41/405 |

OTHER PUBLICATIONS

Luo et al., "New Insights into Cu/SSZ-13 SCR Catalyst Acidity. Part I: Nature of Acidic Sites Probed by NH3 Titration", Feb. 18, 2017, pp. 1-9.

* cited by examiner

SYSTEMS AND METHODS FOR SELECTIVE CATALYTIC REDUCTION AND/OR AMMONIA SLIP CATALYST SULFUR PROTECTION

CROSS-REFERENCE TO RELATED APPLICATION

This application claims priority to and the benefit of U.S. Provisional Patent Application No. 63/013,292, filed Apr. 21, 2020, the disclosure of which is incorporated herein by reference in its entirety.

TECHNICAL FIELD

The present disclosure relates to systems and methods for reducing sulfur-binding to catalysts in exhaust aftertreatment systems. More particularly, the present disclosure relates to systems and methods for treating selective catalytic reduction catalysts and/or ammonia slip catalysts deployed in exhaust aftertreatment systems to reduce an amount of sulfur that binds to the selective catalytic reduction catalyst and/or ammonia slip catalyst.

BACKGROUND

Emissions regulations for internal combustion engines have become more stringent over recent years. Environmental concerns have motivated the implementation of stricter emission requirements for internal combustion engines throughout much of the world. Government agencies, such as the Environmental Protection Agency (EPA) in the United States, carefully monitor the emission quality of engines and set emission standards to which engines must comply. Consequently, the use of exhaust aftertreatment systems to treat engine exhaust gas to reduce emissions is increasing.

Exhaust aftertreatment systems are generally designed to reduce emission of particulate matter, nitrogen oxides (NOx), hydrocarbons, and other environmentally harmful pollutants. Exhaust aftertreatment systems treat engine exhaust gas with catalysts and reductant to convert NOx in the exhaust gas into less harmful compounds. The fuel combusted in internal combustion engines includes sulfur. This sulfur is oxidized during combustion of the fuel, generating sulfur oxides (SOx), such as sulfur dioxide and small amounts of sulfur trioxide. The sulfur oxides may bind to the catalysts in the exhaust aftertreatment system, which may contribute to aging of the catalysts.

SUMMARY

One embodiment relates to a method. The method includes providing a zeolite material including a plurality of active sites bound to a plurality of oxygen ions. The method includes exchanging at least a portion of the plurality of hydrogen ions with a plurality of copper ions, thereby forming a first amount of copper ($Cu^{2+}$) ions bound to two electro-negative oxygen of the zeolite, defined as $Z_2Cu$ sites, and a first amount of copper hydroxide ($Cu(OH)^+$) ions bound to one electro-negative oxygen of the zeolite, defined as ZCuOH sites. The method includes heating the zeolite material to a predefined heat treatment temperature for a predefined time period to transform the zeolite material into a heat treated zeolite material. The heat treated zeolite material includes a second amount of $Z_2Cu$ sites greater than the first amount of $Z_2Cu$ sites and a second amount of ZCuOH sites less than the first amount of ZCuOH sites.

In some embodiments, the zeolite material is coated on a multi-channel substrate before the heating step.

In some embodiments, the method further includes forming a slurry including the heat treated zeolite material and coating the slurry including the heat treated zeolite material onto a multi-channel substrate.

Another embodiment relates to a method. The method includes engaging a catalyst including a zeolite material coated on a multi-channel substrate with an exhaust aftertreatment system configured to receive engine exhaust gas. The zeolite material includes a first amount of active sites bound to copper ($Cu^+$) ions bound to two electro-negative oxygen atoms on the zeolite, defined as $Z_2Cu$ sites, and a first amount of active sites bound to copper hydroxide ($Cu(OH)^+$) ions bound to one electro-negative oxygen of the zeolite, defined as ZCuOH sites. The method includes securing the catalyst within the exhaust aftertreatment system with a matting material structured to expand when heated. The method includes heating the catalyst and the matting material to a predefined heat treatment temperature for a predefined time period to transform the zeolite material into a heat treated zeolite material. The heat treated zeolite material includes a second amount of $Z_2Cu$ active sites greater than the first amount of $Z_2Cu$ active sites and a second amount of ZCuOH active sites less than the first amount of ZCuOH active sites.

Another embodiment relates to a method. The method includes predicting a sulfur exposure of one or more copper-zeolite catalysts deployed in an exhaust aftertreatment system. The method further includes comparing the predicted sulfur exposure to a predefined sulfur exposure threshold. Responsive to the determination, the method includes heating the exhaust aftertreatment catalyst to a predefined heat treatment temperature for a predefined time period to desulfate the one or more copper-zeolite catalysts. The predefined heat treatment temperature is approximately 500° C. to approximately 700° C.

Another embodiment relates to a system. The system includes a controller having at least one processor coupled to at least one memory device storing instructions that, when executed by the at least one processor, cause the controller to perform operations. The operations include predicting a sulfur exposure of one or more copper-zeolite catalysts deployed in an exhaust aftertreatment system, comparing the predicted sulfur exposure to a predefined sulfur exposure threshold, and responsive to the determination, causing a heating of the exhaust aftertreatment catalyst to a predefined heat treatment temperature for a predefined time period to desulfate the one or more copper-zeolite catalysts.

These and other features, together with the organization and manner of operation thereof, will become apparent from the following detailed description when taken in conjunction with the accompanying drawings.

DETAILED DESCRIPTION

Figure 1:
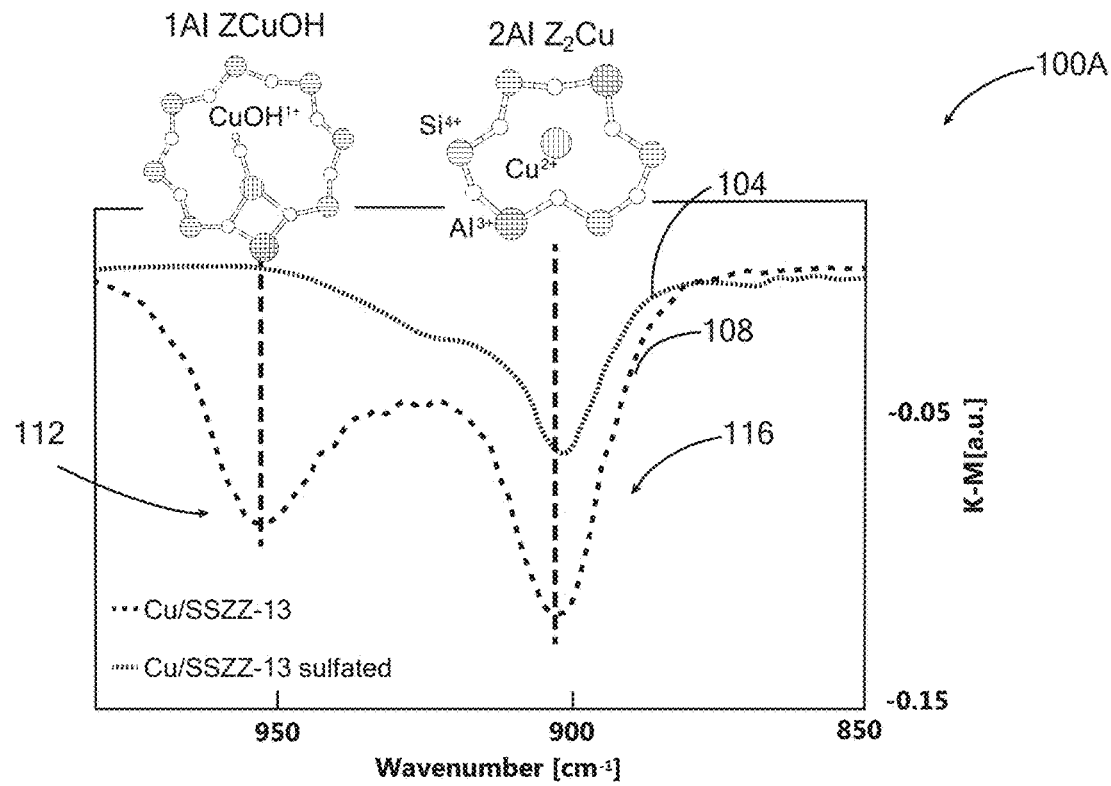
FIG. 1 is a plot of zeolite tetrahedral-oxygen-tetrahedral infrared vibrations that are perturbed by $NH_3$ for a sulfated copper-zeolite catalyst and a non-sulfated copper-zeolite catalyst.

Following below are more detailed descriptions of various concepts related to, and implementations of, methods, apparatuses, and systems for heat treating exhaust aftertreatment system catalysts to reduce an amount of sulfur-binding to the exhaust aftertreatment system catalysts. Exemplary exhaust aftertreatment catalysts include copper-zeolite selective catalytic reduction (SCR) catalysts and/or copper-zeolite ammonia slip catalysts, such as ammonia oxidation (AMOx) catalysts. The various concepts introduced above and discussed in greater detail below may be implemented in any number of ways, as the concepts described are not limited to any particular manner of implementation. Examples of specific implementations and applications are provided primarily for illustrative purposes.

Exhaust aftertreatment systems are structured to receive exhaust emitted by an engine and convert nitrogen oxides (NOx), which include nitrous oxide (NO) and nitrogen dioxide ($NO_2$), in the exhaust gas into less harmful compounds using an SCR catalyst. The exhaust aftertreatment system may also be structured to remove unreacted reductant (urea and/or ammonia) from the exhaust using an AMOx catalyst. Both the SCR catalyst and/or the AMOx catalyst may be copper-zeolite catalysts. Zeolites are microporous aluminosilicate minerals that can bind cations. The bound cations form active sites that catalyze chemical reactions. Exemplary zeolites include zeolites having a small pore framework, a medium pore framework, or a large pore framework. Exemplary zeolites having a small pore framework include SSZ-13, CHA, LTA, AEI, LEV, AFT, AVL, and so on. Exemplary zeolites having a medium pore framework include AEL, FER, MFI, and so on. Exemplary zeolites having a large pore framework include BEA, FAU, MOR, and so on. In the present disclosure, the zeolite is bound to copper-containing cations, such as copper ions ($Cu^{2+}$ ions) and copper hydroxide ions ($Cu(OH)^+$ ions). As used herein, the phrase "active site" means a portion of the copper-zeolite (Cu-zeolite) catalyst that catalyzes chemical reactions. As used herein, $Z_2Cu$ refers to active sites that include $Cu^{2+}$ ions bound to two electro-negative oxygen molecules of the zeolite. ZCuOH refers to active sites that include $Cu(OH)^+$ ions bound to one electro-negative oxygen molecule of the zeolite. The Cu-zeolite catalyst includes a mixture of $Z_2Cu$ and ZCuOH active sites.

The SCR catalyst and the AMOx catalyst may bind sulfur oxides (SOx), which include sulfur dioxide ($SO_2$) and sulfur trioxide ($SO_3$), in the exhaust gas. SOx binding, or sulfation, reduces catalytic functionality of the SCR catalyst and the AMOx catalyst. The $Z_2Cu$ and ZCuOH active sites bind the SOx with different properties. For example, the ZCuOH active site has a higher affinity for SOx than the $Z_2Cu$ active site. Therefore, when exposed to SOx in the exhaust gas, the ZCuOH active sites bind sulfur (become sulfated) faster than the $Z_2Cu$ active sites become sulfated. When the Cu-zeolite is treated to remove the bound sulfur, the $Z_2Cu$ active sites release the SOx (become desulfated) faster than the ZCuOH active sites become desulfated.

FIGS. 1-4 illustrate experimental data to support at least some of the systems, methods, and apparatuses of the present disclosure. FIG. 1 illustrates a plot 100A of zeolite tetrahedral-oxygen-tetrahedral infrared (IR) vibrations that perturbed by $NH_3$ adsorption for a sulfated Cu-zeolite catalyst (line 104) and a non-sulfated Cu-zeolite catalyst (line 108). As is described above, the $Z_2Cu$ and ZCuOH particles both include oxygen molecules that are bound to a copper ion (either as $Cu^{2+}$ or $Cu(OH)^+$). In such configurations, the electrons of the oxygen molecules are in a tetrahedral configuration. The oxygen molecules are in a different configuration when not bound to a copper ion, so their IR vibrations are not visible in FIG. 1. As illustrated in FIG. 1, when the Cu-Zeolite is sulfated, a peak 112 indicating the presence of the ZCuOH active site disappears, suggesting that the $Cu(OH)^+$ ions stop interacting with the zeolite, preventing the zeolite from reacting with NOx or ammonia ($NH_3$) in the exhaust gas. When the $Z_2Cu$ active sites are sulfated, a peak 116 indicative of a presence of the $Z_2Cu$ active site is reduced relative to the peak indicative of a presence of the $Z_2Cu$ active sites present in the non-sulfated zeolite, suggesting that some $Cu^{2+}$ ions stop interacting with the zeolite, but some $Cu^{2+}$ ions still interact with the zeolite, meaning that less $Z_2Cu$ active sites are available to react with the exhaust gas. Therefore, increasing a number of $Z_2Cu$ active sites relative to a number of ZCuOH active sites in Cu-zeolite catalysts may result in better catalyst functionality in the presence of SOx.

Figure 2:
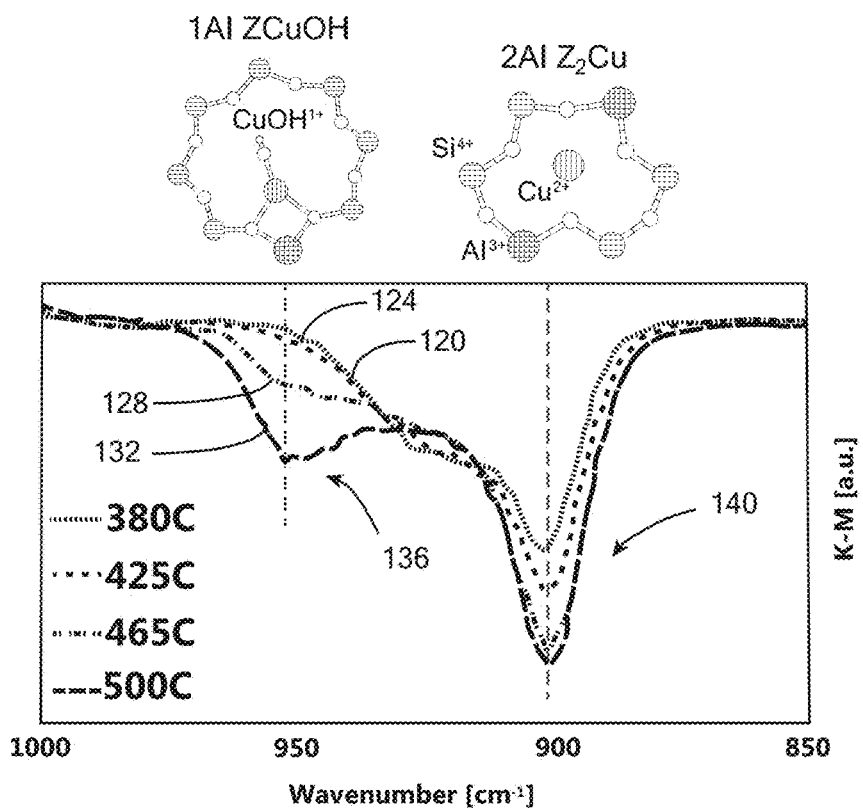
FIG. 2 is a plot of zeolite tetrahedral-oxygen-tetrahedral infrared vibrations that are perturbed by $NH_3$ adsorption for a sulfated Cu-zeolite catalyst that has been exposed to exhaust including SOx and then heat treated at a variety of temperatures.

Heat treating a Cu-zeolite catalyst increases an amount of $Z_2Cu$ active sites relative to an amount of ZCuOH active sites in the Cu-zeolite catalyst. For example, FIG. 2 illustrates a plot 100B of zeolite tetrahedral-oxygen-tetrahedral IR vibrations that are perturbed by $NH_3$ adsorption for a sulfated Cu-zeolite catalyst that has been exposed to exhaust including SOx and then heat treated at approximately 380° C. (line 120), approximately 425° C. (line 124), approximately 465° C. (line 128), and approximately 500° C. (line 132). Plot 100B includes a peak 136 indicative of ZCuOH activity and a peak 140 indicative of $Z_2Cu$ activity. As illustrated by comparison of lines 120-132, the $Z_2Cu$ active sites release more bound SOx during heat treatment than the ZCuOH active sites, meaning that is easier and/or faster to desulfate the $Z_2Cu$ active sites. Therefore, it is advantageous to heat treat the Cu-zeolite catalysts to increase an amount of $Z_2Cu$ active sites relative to an amount of ZCuOH active sites for easier desulfation of the Cu-zeolite catalysts during heat treatment processes, such as the deSOx regeneration methods described herein.

In some embodiments, the copper-zeolite catalyst may be heat treated in the presence of approximately 5 vol. % to 20 vol. % of water. Cu-zeolite SCR catalysts may be heat treated by heating them to temperatures of approximately 500° C. to approximately 700° C. for approximately 1 hour to approximately 100 hours. The heat treatment time period may be approximately 1 hour to 25 hours. Cu-zeolite AMOx catalysts may be heat treated by heating them to approximately 500° C. to approximately 650° C. for approximately 1 hour to approximately 100 hours. The heat treatment time period may be approximately 1 hour to 25 hours. In either embodiment, higher temperature heat treatment temperatures may be used in shorter heat treatment time periods and lower heat treatment temperatures may be used in longer heat treatment time periods.

Figure 3:
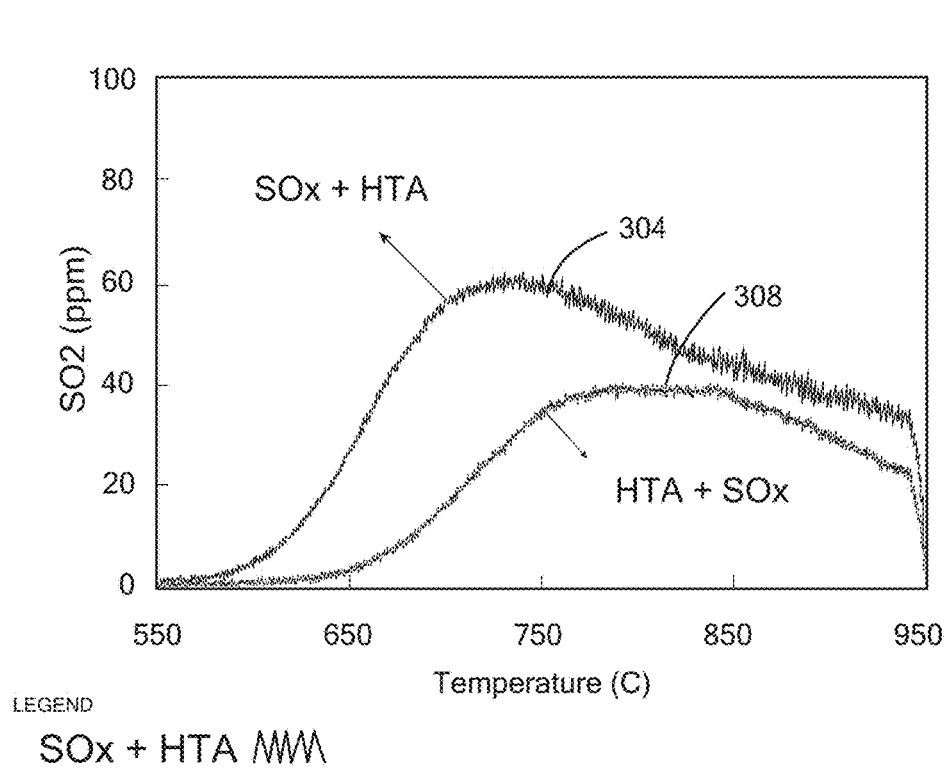
FIG. 3 is a plot of an amount of sulfur dioxide bound to exemplary copper-zeolite selective catalytic reduction (SCR) catalysts as a function of temperature.

FIG. 3 illustrates a plot 300 of an amount of $SO_2$ bound to exemplary Cu-zeolite SCR catalysts as a function of temperature. Line 304 illustrates a first Cu-zeolite SCR catalyst that has been exposed to exhaust gas including 30 ppm SOx (at a $SO_2$/SOx ratio of 0.3) at approximately 200° C. for approximately 100 hours and then heat treated at approximately 650° C. for approximately 10 hours. Line 308 illustrates a second Cu-zeolite SCR catalyst that has been heat treated at approximately 650° C. for approximately 10 hours before being exposed to exhaust gas including 30 ppm SOx (at a $SO_2$/SOx ratio of 0.3) at approximately 200° C. for 100 hours, and then heat treated at approximately 650° C. for approximately 1 hour. As illustrated in FIG. 3, the first Cu-zeolite SCR catalyst (line 304), which was not heat treated before exposure to the exhaust gas including 30 ppm of SOx, has much more bound sulfur than the second Cu-zeolite SCR catalyst (line 308), which was heat treated before exposure to the exhaust gas including 30 ppm of SOx.

Figure 4:
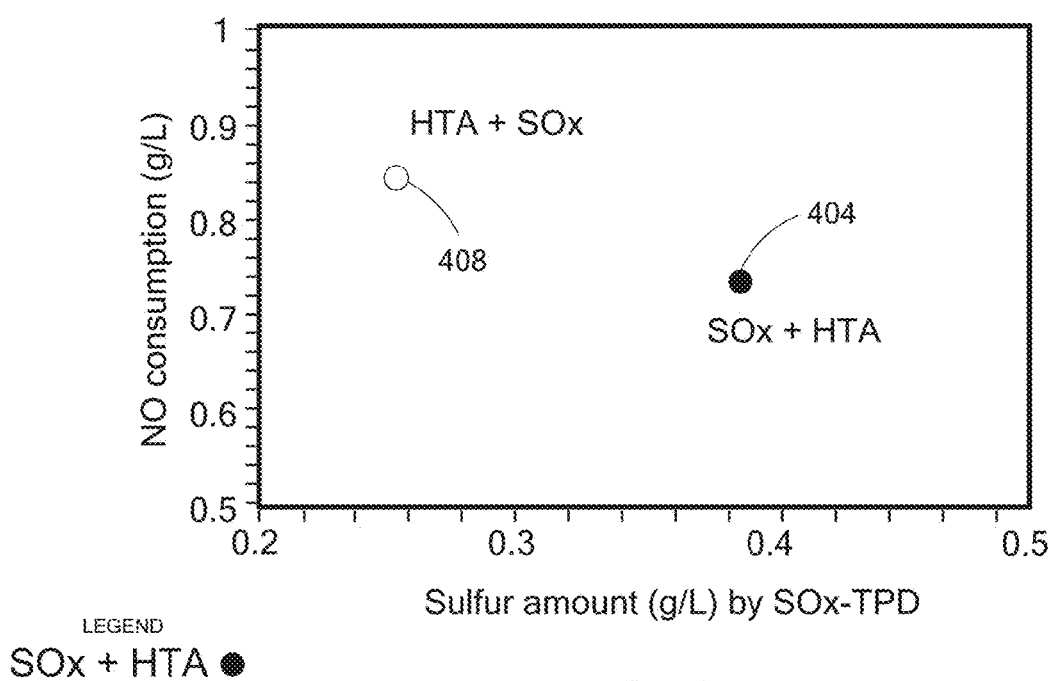
FIG. 4 is a plot of an amount of nitrous oxides (NOx) consumption of exemplary copper-zeolite SCR catalysts as a function of an amount of sulfur oxides (SOx) bound to the exemplary copper-zeolite SCR catalysts.

FIG. 4 illustrates a plot 400 of an amount of NO consumption of exemplary Cu-zeolite SCR catalysts as a function of an amount of SOx bound to the exemplary Cu-zeolite SCR catalysts. Point 404 illustrates the first Cu-zeolite catalyst described above with respect to FIG. 3. Point 408 illustrates the second Cu-zeolite catalyst described above with respect to FIG. 3. As illustrated in FIG. 4, at point 408, the second Cu-zeolite catalyst has less bound SOx and greater consumption of NO. Thus, the heat treatment appears to allow greater NO consumption (e.g., conversion to less harmful species) in the presence of SOx. Therefore, FIGS. 3 and 4 illustrate that it is advantageous to heat treat Cu-zeolite SCR catalysts before operating the Cu-zeolite SCR catalysts in the presence of exhaust gas that includes SOx.

Based on the foregoing and referring to the figures generally, the various embodiments disclosed herein relate to systems, apparatuses, and methods for heat treating Cu-zeolite catalysts to improve their functionality in treating exhaust gas that includes SOx. One embodiment relates to systems, apparatuses and methods for heat-treating Cu-zeolite catalysts before the Cu-zeolite catalysts are deployed in an exhaust aftertreatment system 22. Another embodiment relates to systems, apparatuses, and methods for re-manufacturing Cu-zeolite catalysts. Still another embodiment relates to systems, apparatuses, and methods for heat-treating Cu-zeolite catalysts that are deployed in the exhaust aftertreatment system 22. Yet another embodiment relates to systems, apparatuses, and methods for conducting deSOx regeneration of Cu-zeolite catalysts deployed in the exhaust aftertreatment system 22.

Figure 5:
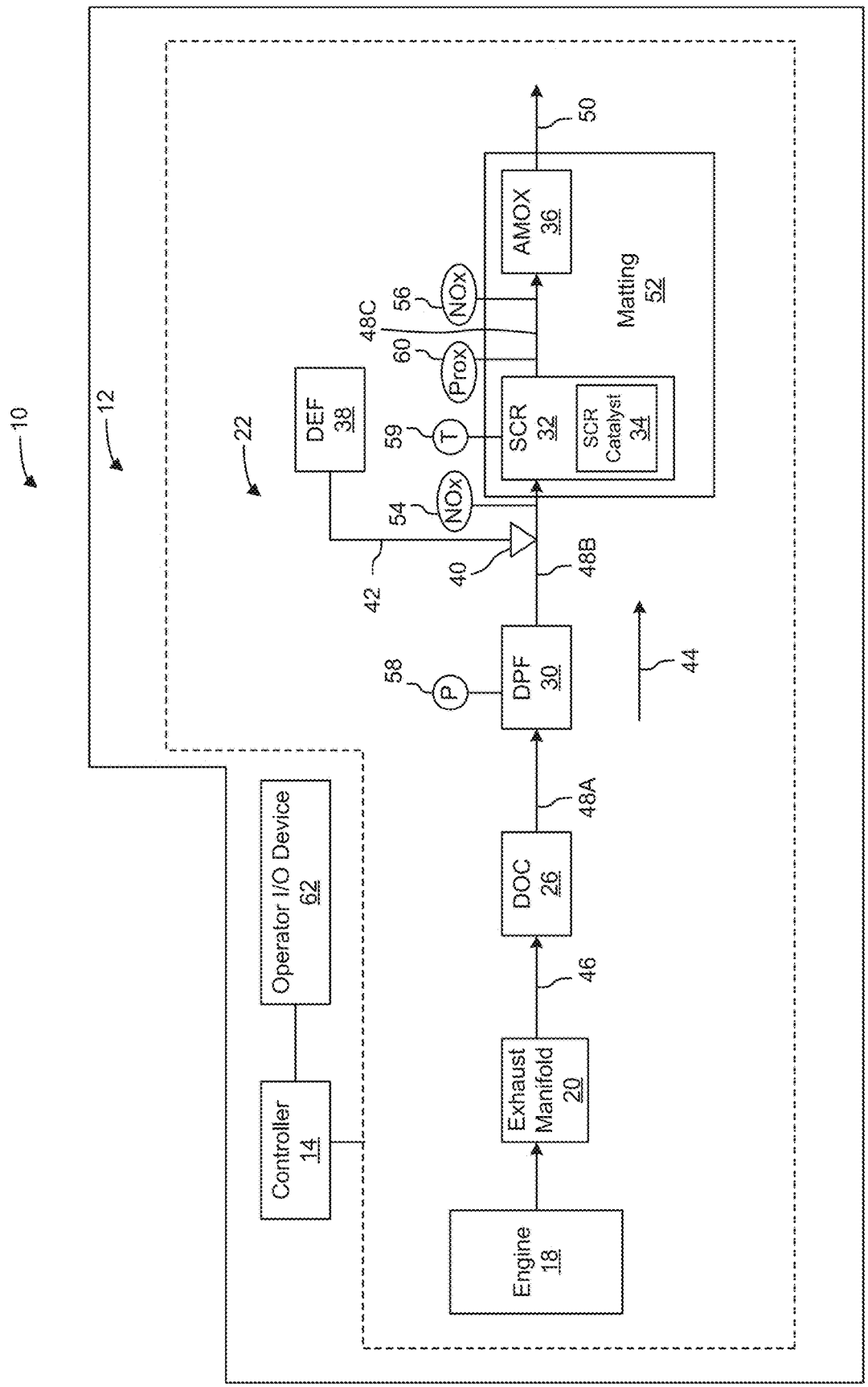
FIG. 5 is a schematic diagram of an exhaust aftertreatment system with a controller, according to an example embodiment.

Referring now to FIG. 5, a vehicle 10 having an engine system 12 including a controller 14 is shown, according to an example embodiment. As shown in FIG. 5, the engine system 12 includes an internal combustion engine, shown as engine 18, and an exhaust aftertreatment system, shown as exhaust aftertreatment system 22. The exhaust aftertreatment system 22 is in exhaust gas-receiving communication with the engine 18. According to one embodiment, the engine 18 is structured as a compression-ignition internal combustion engine that utilizes diesel fuel. However, in various alternate embodiments, the engine 18 may be structured as any other type of engine (e.g., spark-ignition) that utilizes any type of fuel (e.g., gasoline, natural gas). Within the engine 18, air from the atmosphere is combined with fuel, and combusted, to power the engine 18. Combustion of the fuel and air in the compression chambers of the engine 18 produces exhaust gas that is operatively vented to an exhaust manifold 20 and to the exhaust aftertreatment system 22.

In the example depicted, the exhaust aftertreatment system 22 includes a diesel oxidation catalyst (DOC) 26, a diesel particulate filter (DPF) 30, a selective catalytic reduction (SCR) system 32 with a SCR catalyst 34, and an ammonia oxidation (AMOx) catalyst 36. The SCR system 32 further includes a reductant delivery system that has a reductant source, shown as diesel exhaust fluid (DEF) source 38, that supplies reductant (e.g., DEF, urea, ammonia) to a reductant doser 40, via a reductant line, shown as a reductant delivery line 42. In another example, the SCR system 32 may include multiple reductant dosers 40 positioned along the exhaust aftertreatment system 22. Although the exhaust aftertreatment system 22 shown includes the DOC 26, the DPF 30, the SCR catalyst 34, and the AMOx catalyst 36 positioned in specific locations relative to each other along the exhaust flow path, in other embodiments, the exhaust aftertreatment system 22 may include more than one of any of the various catalysts positioned in any of various positions relative to each other along the exhaust flow path as desired. Further and in this regard, it should be noted that the components of the exhaust aftertreatment system 22 may be in a variety of different orders; different components may be used in other embodiments; not all the components shown in this embodiment may be used in other architectures; and, various other modifications may be used without departing from the spirit and scope of the present disclosure. Therefore, the architecture of the exhaust aftertreatment system 22 shown in FIG. 1 is for illustrative purposes and should not be considered to be limiting.

In an exhaust flow direction, as indicated by directional arrow 44, exhaust gas flows from the engine 18 into inlet piping 46 of the exhaust aftertreatment system 22. From the inlet piping 46, the exhaust gas flows into the DOC 26 and exits the DOC 26 into a first section of exhaust piping 48A. From the first section of exhaust piping 48A, the exhaust gas flows into the DPF 30 and exits the DPF 30 into a second section of exhaust piping 48B. From the second section of exhaust piping 48B, the exhaust gas flows into the SCR catalyst 34 and exits the SCR catalyst 34 into a third section of exhaust piping 48C. As the exhaust gas flows through the second section of exhaust piping 48B, it may be periodically dosed with reductant (e.g., DEF, ammonia, urea) by the reductant doser 40. Accordingly, the second section of exhaust piping 48B may act as a decomposition chamber or tube to facilitate the decomposition of the reductant to ammonia. From the third section of exhaust piping 48C, the exhaust gas flows into the AMOx catalyst 36 and exits the AMOx catalyst 36 into outlet piping 50 before the exhaust gas is expelled from the exhaust aftertreatment system 22. Based on the foregoing, in the illustrated embodiment, the DOC 26 is positioned upstream of the DPF 30, the DPF 30 is positioned upstream of the SCR catalyst 34, and the SCR catalyst 34 is positioned upstream of the AMOx catalyst 36. However, in other embodiments and as describe above, other arrangements of the components of the exhaust aftertreatment system 22 are also possible.

The DOC 26 may have any of various flow-through designs. Generally, the DOC 26 is structured to oxidize at least some particulate matter, e.g., the soluble organic fraction of soot, in the exhaust and reduce unburned hydrocarbons (HC) and carbon monoxide (CO) in the exhaust to less environmentally harmful compounds. For example, the DOC 26 may be structured to reduce the HC and CO concentrations in the exhaust to meet the requisite emissions standards for those components of the exhaust gas. An indirect consequence of the oxidation capabilities of the DOC 26 is the ability of the DOC 26 to oxidize NO into $NO_2$. In this manner, the level of $NO_2$ the DOC 26 is equal to the $NO_2$ in the exhaust gas generated by the engine 18 plus the $NO_2$ converted from NO by the DOC 26.

In addition to treating the hydrocarbon and CO concentrations in the exhaust gas, the DOC 26 may also be used in the controlled regeneration of the DPF 30, the SCR catalyst 34, and the AMOx catalyst 36. This can be accomplished through the injection, or dosing, of unburned HC into the exhaust gas upstream of the DOC 26. Upon contact with the DOC 26, the unburned HC undergoes an exothermic oxidation reaction which leads to an increase in the temperature of the exhaust gas exiting the DOC 26 and subsequently entering the DPF 30, the SCR catalyst 34, and/or the AMOx catalyst 36. The amount of unburned HC added to the exhaust gas is selected to achieve the desired temperature increase or target controlled regeneration temperature.

The DPF 30 may be any of various flow-through or wall-flow designs, and is structured to reduce particulate matter concentrations, e.g., soot and ash, in the exhaust gas to meet or substantially meet requisite emission standards. The DPF 30 captures particulate matter and other constituents, and thus may need to be periodically regenerated to burn off the captured constituents. Additionally, the DPF 30 may be structured to oxidize NO to form $NO_2$ independent of the DOC 26.

As discussed above, the SCR system 32 may include a reductant delivery system with a reductant (e.g., DEF) source 38, a pump, and a delivery mechanism or reductant doser 40. The reductant source 38 can be a container or tank capable of retaining a reductant, such as, for example, ammonia ($NH_3$), DEF (e.g., urea), or diesel oil. The reductant source 38 is in reductant supplying communication with the pump, which is structured to pump reductant from the reductant source 38 to the reductant doser 40 via the reductant delivery line 42. The reductant doser 40 may be positioned upstream of the SCR catalyst 34. The reductant doser 40 is selectively controllable to inject reductant directly into the exhaust gas prior to entering the SCR catalyst 34. In some embodiments, the reductant may either be ammonia or DEF, which decomposes to produce ammonia. As briefly described above, the ammonia reacts with NOx in the presence of the SCR catalyst 34 to reduce the NOx to less harmful emissions, such as $N_2$ and $H_2O$. The NOx in the exhaust gas includes $NO_2$ and NO. Generally, both $NO_2$ and NO are reduced to $N_2$ and $H_2O$ through various chemical reactions driven by the catalytic elements of the SCR catalyst 34 in the presence of reductant such as $NH_3$.

The SCR catalyst 34 is configured to bind the reductant in the exhaust gas and facilitate reactions between the bound reductant and NOx in the exhaust gas to reduce the NOx in the exhaust gas into less harmful compounds. In the illustrated embodiment, the SCR catalyst 34 is a zeolite-based catalyst, such as a copper-zeolite (Cu-zeolite) catalyst. The SCR catalyst 34 includes active sites that contain copper cations, such as copper ions ($Cu^{2+}$ ions) and copper hydroxide ($Cu(OH)^+$ ions). As used herein, $Z_2Cu$ refers to Cu-zeolite active sites that contain $Cu^{2+}$ ions bound to two electro-negative oxygen molecules of the zeolite and ZCuOH refers to Cu-zeolite active sites that contain $Cu(OH)^+$ ions bound to one electro-negative oxygen molecule of the zeolite. The SCR catalyst 34 includes a mixture of $Z_2Cu$ and ZCuOH active sites. In other embodiments, the zeolite of the SCR catalyst 34 may be bound to different cations, such as iron, calcium, magnesium, and oxides thereof, potassium, and so on.

The AMOx catalyst 36 is structured to react with ammonia to produce mainly nitrogen. As briefly described above, the AMOx catalyst 36 is structured to remove ammonia that has slipped through or exited the SCR catalyst 34 without reacting with NOx in the exhaust. In certain instances, the exhaust aftertreatment system 22 may be operable with or without the AMOx catalyst 36. Further, although the AMOx catalyst 36 is shown as a separate unit from the SCR catalyst 34 in FIG. 5, in some implementations, the AMOx catalyst 36 may be integrated with the SCR catalyst 34, e.g., the AMOx catalyst 36 and the SCR catalyst 34 may be located within the same housing. According to the present disclosure, the SCR catalyst 34 and the AMOx catalyst 36 are positioned serially, with the SCR catalyst 34 preceding the AMOx catalyst 36. As described above, in various other embodiments, the AMOx catalyst 36 is not included in the exhaust aftertreatment system 22.

In the illustrated embodiment, the AMOx catalyst 36 is a dual-layer catalyst that includes a first layer that is a zeolite-based catalyst, such as a copper-Zeolite (Cu-zeolite) catalyst and a second layer that is a platinum group metal (PGM) catalyst. The AMOx catalyst 36 includes active sites that contain copper cations, such as copper ions ($Cu^{2+}$ ions) and copper hydroxide ($CuOH^+$ ions). As used herein, $Z_2Cu$ refers to Cu-zeolite active sites that contain $Cu^{2+}$ ions bound to two electro-negative oxygen molecules of the zeolite and ZCuOH refers to Cu-zeolite active sites that contain $Cu(OH)^+$ ions bound to one electro-negative oxygen molecule of the zeolite. The AMOx catalyst 36 includes a mixture of $Z_2Cu$ and ZCuOH active sites. In other embodiments, the zeolite of the AMOx catalyst 36 may be bound to different cations, such as iron, calcium, magnesium, and oxides thereof, potassium, and so on. In some embodiments, lower heat treatment temperatures (relative to the heat treatment temperatures used for the SCR catalyst 34) are for the AMOx catalyst 36 to reduce a likelihood of causing sintering of the PGM layer of the AMOx catalyst 36.

A matting material may be positioned in the exhaust aftertreatment system 22 surrounding at least a portion of the SCR catalyst 34 (shown as matting material 52A) and/or the AMOx catalyst 36 (shown as matting material 52B). The matting material 52A, 52B is structured to expand when heated to prevent the exhaust gas from bypassing the SCR catalyst 34 and/or the AMOx catalyst. In some embodiments, the matting material may include ceramic fibers of alumina, aluminosilicates, and/or vermiculite (e.g., magnesium-iron-aluminosilicate).

Figure 6:
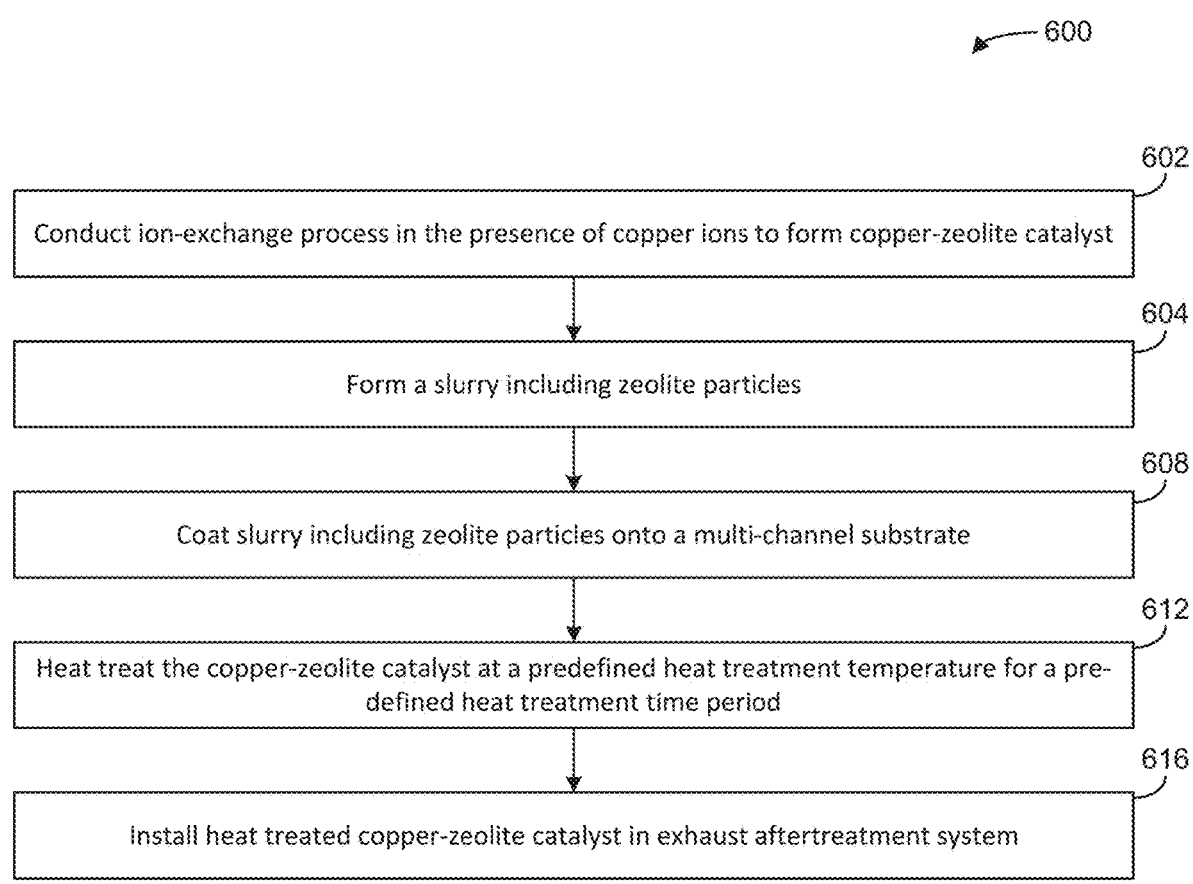
FIG. 6 is a flow diagram of a method for manufacturing a copper-zeolite catalyst that can be used as an SCR catalyst and/or an AMOx catalyst.

FIG. 6 illustrates an exemplary method 600 for manufacturing a Cu-zeolite catalyst that can be used as the SCR catalyst 34 and/or the AMOx catalyst 36. At process 602, an ion-exchange process is conducted in the presence of copper ions (e.g., $Cu^{2+}$ and $Cu(OH)^+$ ions) to exchange (e.g., replace) at least a portion of the hydrogen ions bound to the zeolite active sites with the copper ions. After process 602, the zeolite is Cu-zeolite and includes a mixture of $Z_2Cu$ active sites and ZCuOH active sites. At process 604, a slurry including the zeolite particles is formed. The slurry includes the zeolite particles, a binder structured to adhere the zeolite particles to a catalyst structure, and may include one or more additional additives. At process 608, slurry of zeolite particles is coated onto a multi-channel substrate to form a zeolite-coated catalyst structure.

At process 612, the Cu-zeolite catalyst is heat treated at a predefined heat treatment temperature for a predefined heat treatment time period to convert at least a portion of the ZCuOH active sites into $Z_2Cu$ active sites, thereby increasing an amount of $Z_2Cu$ active sites relative to an amount of ZCuOH active sites in the Cu-zeolite catalyst. The predefined heat treatment temperature is a temperature or range of temperatures high enough to catalyze conversion of ZCuOH active sites into $Z_2Cu$ active sites and low enough to reduce a likelihood of heat degradation of the Cu-zeolite catalyst. In embodiments in which the Cu-zeolite catalyst is the SCR catalyst 34, the heat treatment temperature is approximately 500° C. to approximately 700° C. In such embodiments, the heat treatment time period may be approximately 1 hour to approximately 100 hours. The heat treatment time period may be approximately 1 hour to 25 hours. In embodiments in which the Cu-zeolite catalyst is the AMOx catalyst 36, the heat treatment temperature is approximately 500° C. to approximately 650° C. In such embodiments, the heat treatment time period is from approximately 1 hour to approximately 100 hours. The heat treatment time period may be approximately 1 hour to 25 hours. In either embodiment, higher temperature heat treatment temperatures may be used in shorter heat treatment time periods and lower heat treatment temperatures may be used in longer heat treatment time periods. In contrast, typical coating processes heat the Cu-zeolite catalyst to temperatures of approximately 450-500° C. to remove moisture and organic materials form the Cu-zeolite catalyst. In some embodiments, process 612 may be carried out in the presence of water to enhance the conversion of ZCuOH active sites into $Z_2Cu$ active sites. In such embodiments, approximately 5 vol. % to approximately 20 vol. % of water may be introduced during heat treatment. At process 616, the heat treated Cu-zeolite catalyst is installed in the exhaust aftertreatment system 22.

Figure 7:
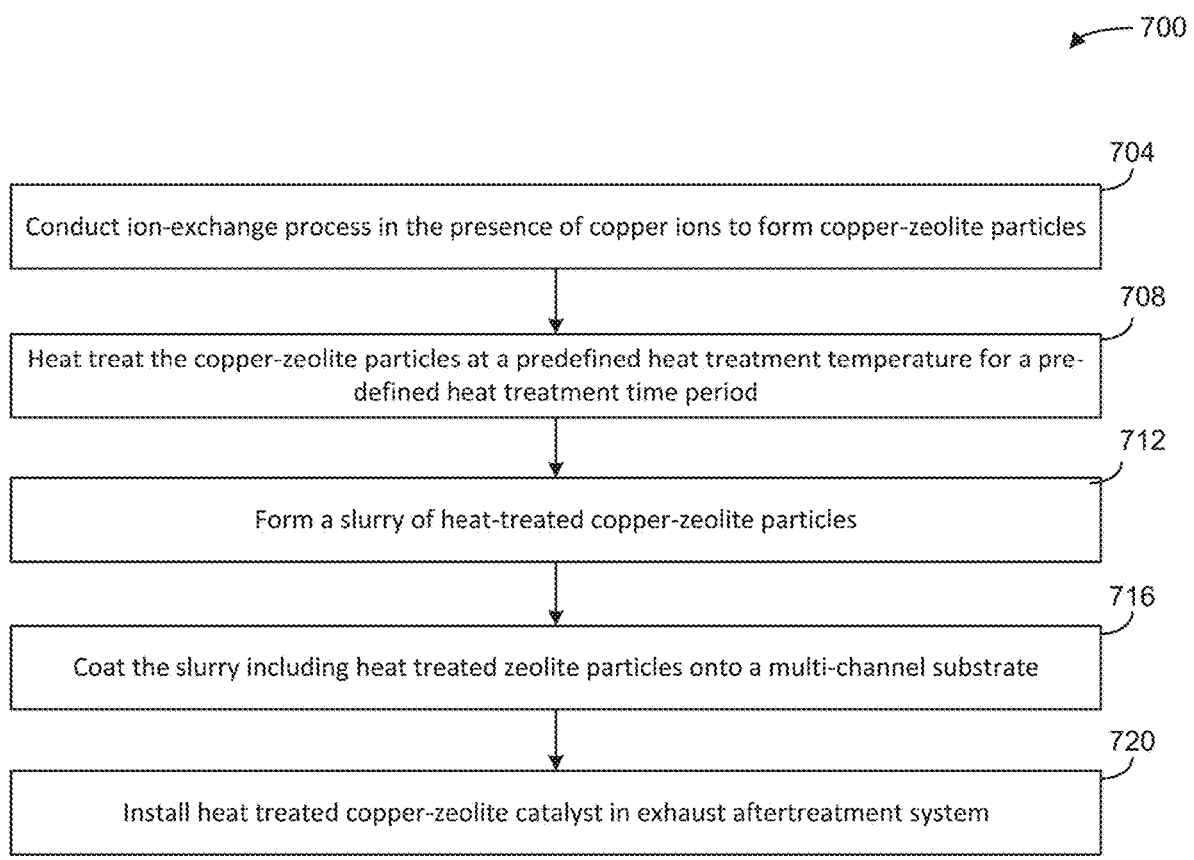
FIG. 7 is a flow diagram of another method for manufacturing a copper-zeolite catalyst that can be used as an SCR catalyst and/or an AMOx catalyst.

FIG. 7 illustrates an exemplary method 700 for manufacturing a Cu-zeolite catalyst that can be used as the SCR catalyst 34 and/or the AMOx catalyst 36. At process 704, an ion-exchange process is conducted in the presence of copper ions (e.g., $Cu^{2+}$ and $Cu(OH)^+$ ions) to exchange (e.g., replace) at least a portion of the hydrogen ions bound to the zeolite active sites with the copper ions. After process 704, the zeolite is Cu-zeolite and includes a mixture of $Z_2Cu$ active sites and ZCuOH active sites.

At process 708, the Cu-zeolite catalyst is heat treated at a predefined heat treatment temperature for a predefined heat treatment time period to convert at least a portion of the ZCuOH active sites into $Z_2Cu$ active sites, thereby increasing an amount of $Z_2Cu$ active sites relative to an amount of ZCuOH active sites in the Cu-zeolite catalyst. The predefined heat treatment temperature is a temperature or range of temperatures high enough to catalyze conversion of ZCuOH active sites into $Z_2Cu$ active sites and low enough to reduce a likelihood of heat degradation of the Cu-zeolite catalyst. In embodiments in which the Cu-zeolite catalyst is the SCR catalyst 34, the heat treatment temperature is approximately 500° C. to approximately 700° C. In such embodiments, the heat treatment time period is approximately 1 hour to approximately 100 hours. The heat treatment time period may be approximately 1 hour to 25 hours. In embodiments in which the Cu-zeolite catalyst is the AMOx catalyst 36, the heat treatment temperature is approximately 500° C. to approximately 650° C. In such embodiments, the heat treatment time period is approximately 1 hour to approximately 100 hours. The heat treatment time period may be approximately 1 hour to 25 hours. In either embodiment, higher temperature heat treatment temperatures may be used in shorter heat treatment time periods and lower heat treatment temperatures may be used in longer heat treatment time periods. In contrast, typical coating processes heat the Cu-zeolite catalyst to temperatures of approximately 450-500° C. to remove moisture and organic materials form the Cu-zeolite catalyst. In some embodiments, process 708 may be carried out in the presence of water to enhance the conversion of ZCuOH active sites into $Z_2Cu$ active sites. In such embodiments, approximately 5 vol. % to approximately 20 vol. % of water may be introduced during heat treatment. At process 712, a slurry including the heat treated Cu-zeolite particles is formed. At process 716, the slurry including the heat treated Cu-zeolite particles is coated onto a multi-channel substrate. At process 720, the heat treated Cu-zeolite catalyst is installed in the exhaust aftertreatment system 22.

After the SCR catalyst 34 and/or the AMOx catalyst 36 are installed in the exhaust aftertreatment system 22, the matting material 52A, 52B is positioned in the exhaust aftertreatment system 22 surrounding at least a portion of the SCR catalyst 34 and/or the AMOx catalyst 36. The matting material 52A, 52B is structured to expand when heated to prevent the exhaust gas from bypassing the SCR catalyst 34 and/or the AMOx catalyst. In some embodiments, the matting material 52A, 52B may be heated by the engine 18. In other embodiments, the matting material 52A, 52B may be heated by external heaters and/or a combination of the engine 18 and external heaters.

During use, the Cu-zeolite catalyst (e.g., the SCR catalyst 34 and/or the AMOx catalyst 36) may be exposed to SOx from the fuel combusted by the engine 18. Exposure to SOx over time and miles travelled by vehicle 10 may cause degradation of the Cu-zeolite catalyst. Degraded Cu-zeolite catalysts may be removed during maintenance. The degraded Cu-zeolite catalysts may be heat treated to re-manufacture the degraded Cu-zeolite catalysts. The heat treatment may cause both the ZCuOH active sites and the $Z_2Cu$ active sites of the Cu-zeolite catalyst to release bound sulfur (e.g., cause desulfation of the Cu-zeolite catalysts). The heat treatment may also cause at least a portion of the ZCuOH active sites to convert into $Z_2Cu$ active sites.

Figure 8:
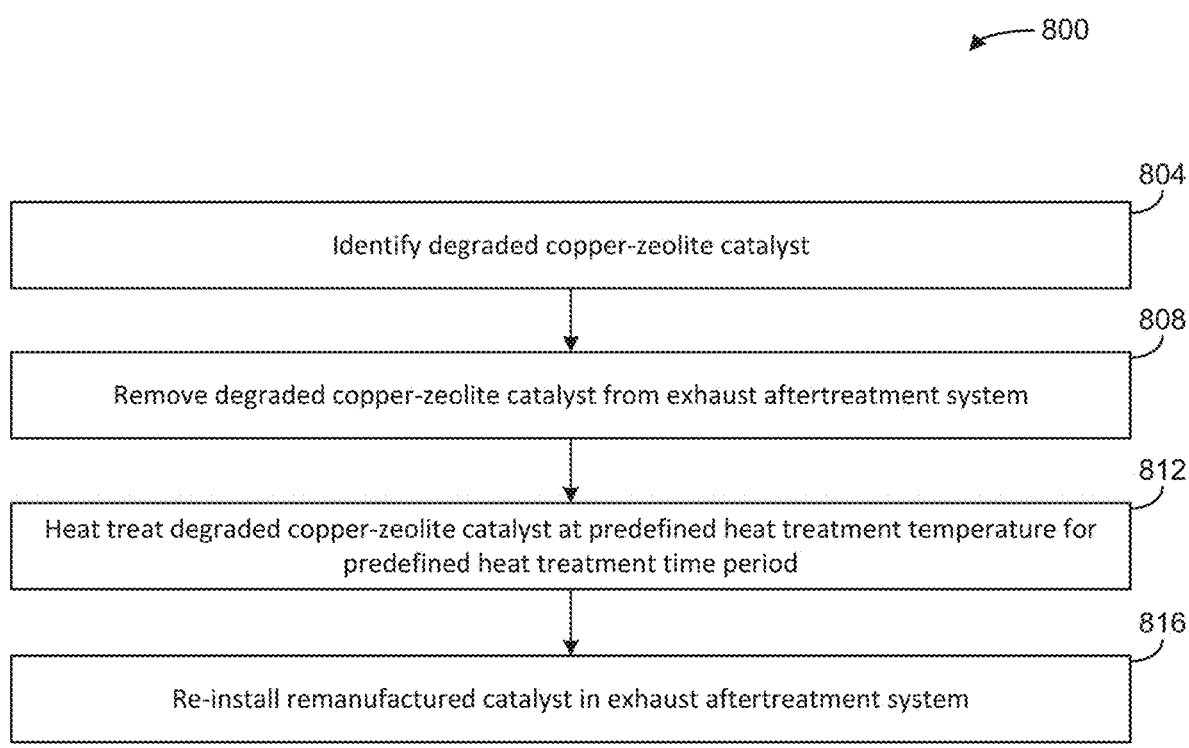
FIG. 8 is a flow diagram of a method for re-manufacturing a copper-zeolite catalyst that can be used as an SCR catalyst and/or an AMOx catalyst.

FIG. 8 illustrates an exemplary method 800 for re-manufacturing a Cu-zeolite catalyst that can be used as the SCR catalyst 34 and/or the AMOx catalyst 36. At process 804, the degraded Cu-zeolite catalyst is identified. In some embodiments, the controller 14 may determine that the Cu-zeolite catalyst is likely degraded based on one or more of an amount of fuel combusted since the Cu-zeolite catalyst was deployed in the exhaust aftertreatment system 22, an amount of fuel combusted since a last deSOx regeneration of the Cu-zeolite catalyst, a type of fuel combusted, and/or an amount of time and/or an amount of mileage that the Cu-zeolite catalyst has been deployed in the exhaust aftertreatment system 22. In some embodiments, the controller 14 may determine that the Cu-zeolite catalyst is likely degraded based on an amount of NOx exiting the exhaust aftertreatment system 22. In some embodiments, the controller 14 may determine that the Cu-zeolite catalyst is likely degraded based on fault codes indicating that the Cu-zeolite catalyst is likely degraded and/or fault codes indicating that a NOx concentration at or proximate an exit of the exhaust aftertreatment system 22 is at or above a predefined threshold.

At process 808, the degraded Cu-zeolite catalyst is removed from the exhaust aftertreatment system 22. At process 812, the degraded Cu-zeolite catalyst is heat treated at a predefined re-manufacture heat treatment temperature for a predefined re-manufacture heat treatment time period. The predefined re-manufacture heat treatment temperature is a temperature or range of temperatures high enough to catalyze release of sulfur from the ZCuOH active sites and the $Z_2Cu$ active sites and low enough to reduce a likelihood of heat degradation of the Cu-zeolite catalyst. The heat treatment may also convert at least a portion of the ZCuOH active sites into $Z_2Cu$ active sites, thereby increasing an amount of $Z_2Cu$ active sties relative to an amount of ZCuOH active sites in the Cu-zeolite catalyst. In embodiments in which the Cu-zeolite catalyst is the SCR catalyst 34, the re-manufacture heat treatment temperature is approximately 500° C. to approximately 700° C. In such embodiments, the heat treatment time period is approximately 1 hour to approximately 100 hours. The heat treatment time period may be approximately 1 hour to 25 hours. In embodiments in which the Cu-zeolite catalyst is the AMOx catalyst 36, the re-manufacture heat treatment temperature is approximately 500° C. to approximately 650° C. In such embodiments, the heat treatment time period is from approximately 1 hour to approximately 100 hours. The heat treatment time period may be approximately 1 hour to 25 hours. In either embodiment, higher temperature heat treatment temperatures may be used in shorter heat treatment time periods and lower heat treatment temperatures may be used in longer heat treatment time periods. In some embodiments, process 812 may be carried out in the presence of water to enhance the conversion of ZCuOH active sites into $Z_2Cu$ active sites. In such embodiments, approximately 5 vol. % to approximately 20 vol. % of water may be introduced during heat treatment. At process 816, the re-manufactured Cu-zeolite catalyst may be re-installed in the exhaust aftertreatment system 22.

Returning to FIG. 5, the exhaust aftertreatment system 22 may include various sensors, such as NOx sensors, oxygen sensors, temperature sensors, pressure sensors, proximity sensors, and so on. The various sensors may be strategically disposed throughout the exhaust aftertreatment system 22 and may be in communication with the controller 14 to monitor operating conditions of the exhaust aftertreatment system 22 and/or the engine 18. As shown in FIG. 5, the exhaust aftertreatment system 22 includes a first NOx sensor 54 positioned at or upstream of the inlet of the SCR catalyst 34, a second NOx sensor 56 positioned at or downstream of the outlet of the SCR catalyst 34, one or more temperature sensors 59 at or proximate the SCR catalyst 34 and/or the AMOx catalyst 36 and one or more pressure sensors 58 positioned at or proximate the DPF 30. The exhaust aftertreatment system 22 may also include one or more proximity sensors 60 at or proximate the SCR catalyst 34 and/or the AMOx catalyst 36. In some embodiments, the first NOx sensor 54 can be positioned at or downstream of the inlet of the exhaust aftertreatment system 22. In some embodiments, the second NOx sensor 56 can be positioned at or downstream of the outlet of the exhaust aftertreatment system 22.

The first NOx sensor 54 is structured to determine information indicative of a NOx concentration of the exhaust gas entering the exhaust aftertreatment system 22. The second NOx sensor 56 is structured to determine information indicative of an outlet NOx concentration. As used herein, "outlet NOx concentration" means the NOx concentration of the exhaust gas exiting the SCR catalyst 34, the AMOx catalyst 36, or the exhaust aftertreatment system 22. The pressure sensor(s) 58 are structured to determine a pressure drop across the DPF 30. The one or more temperature sensors 59 are structured to determine one or more of the exhaust gas at or proximate an inlet of the SCR or AMOx catalysts 34, 36, a temperature of a bed of the SCR catalyst 34 and/or the AMOx catalyst 36, and/or a temperature of the exhaust gas at or proximate an outlet of the SCR catalyst 34 and/or the AMOx catalyst 36. The one or more proximity sensors 60 are structured to detect a presence and/or an absence of the SCR catalyst 34 and/or the AMOx catalyst 36. While FIG. 5 depicts several sensors (e.g., the first NOx sensor 54, the second NOx sensor 56, the pressure sensor 58, the temperature sensor 59, and the proximity sensor 60), it should be understood that one or more of these sensors may be replaced by virtual sensor in other embodiments. In this regard, the NOx amount at various locations may be estimated, determined, or otherwise correlated with various operating conditions of the engine 18 and exhaust aftertreatment system 22.

FIG. 5 is also shown to include an operator input/output (I/O) device 62. The operator I/O device 62 is communicably coupled to the controller 14, such that information may be exchanged between the controller 14 and the operator I/O device 62, wherein the information may relate to one or more components of FIG. 1 or determinations (described below) of the controller 14. The operator I/O device 62 enables an operator of the engine system 12 to communicate with the controller 14 and one or more components of the engine system 12 of FIG. 5. For example, the operator I/O device 62 may include, but is not limited to, an interactive display, a touchscreen device, one or more buttons and switches, voice command receivers, etc. In various alternate embodiments, the controller 14 and components described herein may be implemented with non-vehicular applications (e.g., a power generator). Accordingly, the operator I/O device 62 may be specific to those applications. For example, in those instances, the operator I/O device 62 may include a laptop computer, a tablet computer, a desktop computer, a phone, a watch, a personal digital assistant, etc. Via the operator I/O device 62, the controller 14 may provide diagnostic information, a fault or service notification based on the determined concentration of one or more of the NOX and/or a fault or service indication indicating that the SCR catalyst 34 and/or the AMOx catalyst 36 are likely degraded.

The controller 14 is structured to control, at least partly, the operation of the engine system 12 and associated subsystems, such as the internal combustion engine 18 and the exhaust aftertreatment system 22. According to one embodiment, the components of FIG. 1 are embodied in a vehicle 10. The vehicle may include an on-road or an off-road vehicle including, but not limited to, line-haul trucks, mid-range trucks (e.g., pick-up trucks), cars, boats, tanks, airplanes, and any other type of vehicle that utilizes an exhaust aftertreatment system. In various alternate embodiments, as described above, the controller 14 may be used with any engine-exhaust aftertreatment system (e.g., a stationary power generation system).

Components of the vehicle 10 may communicate with each other or foreign components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 14 is communicably coupled to the systems and components in the vehicle 10 of FIG. 5, the controller 14 is structured to receive data regarding one or more of the components shown in FIGS. 5 and 9. For example, the data may include operation data regarding the operating conditions of the engine 18, the reductant doser 40, the SCR catalyst 34 and/or other components (e.g., a battery system, a motor, a generator, a regenerative braking system) acquired by one or more sensors.

As the components of FIG. 5 are shown to be embodied in the engine system 12, the controller 14 may be structured as one or more electronic control units (ECU). The controller 14 may be separate from or included with at least one of a transmission control unit, an exhaust aftertreatment control unit, a powertrain control circuit, an engine control circuit, etc. The function and structure of the controller 14 is described in greater detail in FIG. 2.

The operator I/O device 62 may enable an operator of the vehicle 10 (or passenger or manufacturing, service, or maintenance personnel) to communicate with the vehicle 10 and the controller 14. By way of example, the operator I/O device 62 may include, but is not limited to, an interactive display, a touchscreen device, one or more buttons and switches, voice command receivers, and the like. In one embodiment, the operator I/O device 62 may display fault indicators to the operator of the vehicle.

Figure 9:
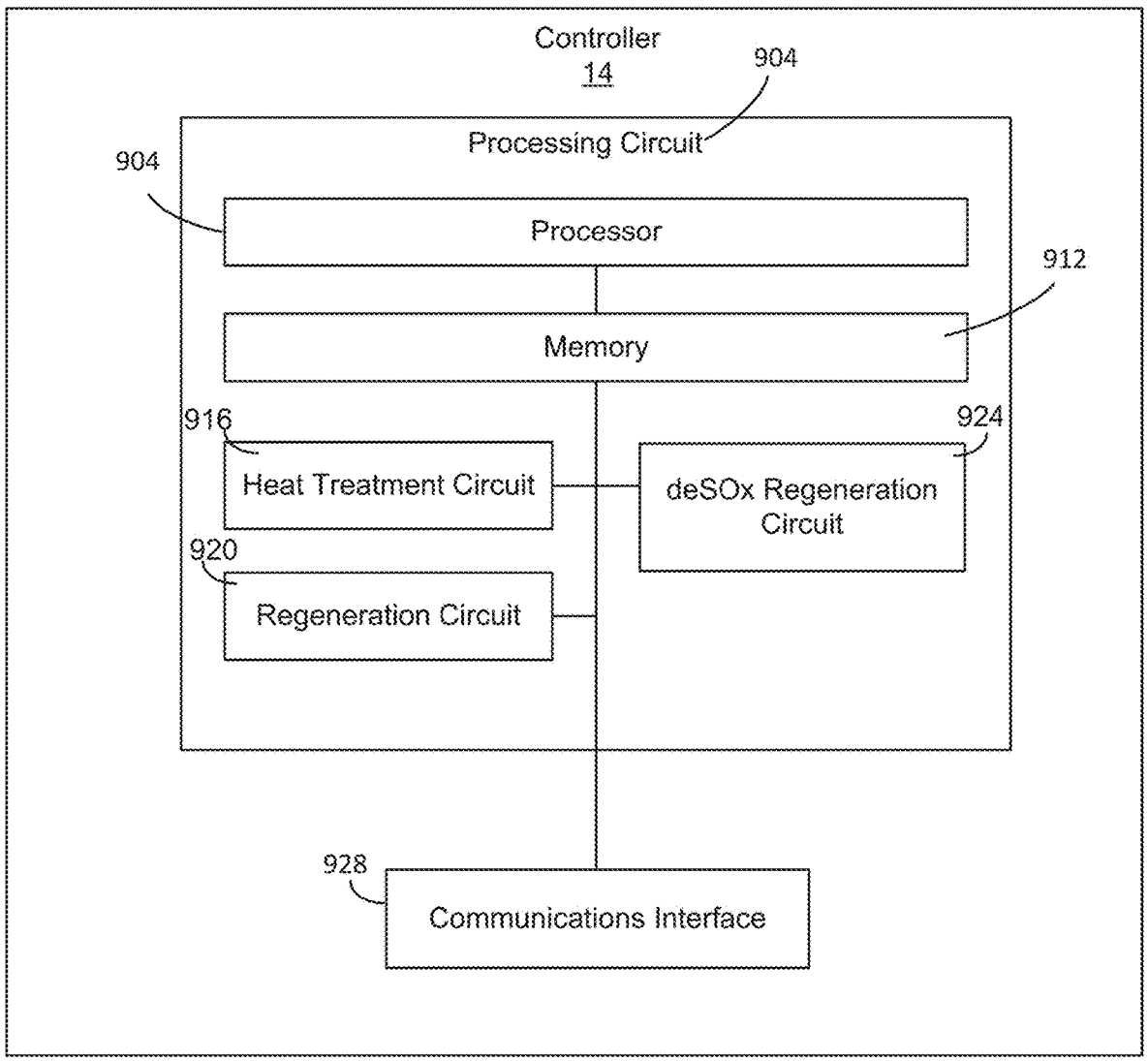
FIG. 9 is a schematic diagram of the controller of the system of FIG. 5 according to an example embodiment.

As the components of FIGS. 5 and 9 are shown to be embodied in the vehicle 10, the controller 14 may be structured as one or more electronic control units (ECU). As such, the controller 14 may be separate from or included with at least one of a transmission control unit, an exhaust aftertreatment control unit, a powertrain control circuit, an engine control circuit, etc. The function and structure of the controller 14 is described in greater detail in FIG. 2.

Referring now to FIG. 9, a schematic diagram of the controller 14 of the vehicle 10 of FIG. 5 is shown according to an example embodiment. As shown in FIG. 9, the controller 14 includes a processing circuit 904 having a processor 908 and a memory device 912, a heat treatment circuit 916, a regeneration circuit 920, a desulfation (deSOx) regeneration circuit 924, and the communications interface 928. Generally, the controller 14 is structured to determine that Cu-zeolite catalysts (e.g., the SCR catalyst 34 and/or the AMOx catalyst 36) in the exhaust aftertreatment system 22 are in need of heat treatment or regeneration. For example, the controller 14 may be structured to determine, based on information input by an operator via the operator I/O device 62 or information sensed by the proximity sensor 60, that a new or remanufactured installed Cu-zeolite catalyst has been installed in the exhaust aftertreatment system 22. The controller 14 may then command a heat treatment process (e.g., methods 1000-1100). For example, the controller 14 may be structured to determine, based on information indicative of a high outlet NOx concentration or a fault code, that a Cu-zeolite catalyst in the exhaust aftertreatment system 22 likely requires deSOx regeneration. The controller 14 may then command a deSOx regeneration process (e.g., methods 1200-1300).

In one configuration, the heat treatment circuit 916, the regeneration circuit 920, and the deSOx regeneration circuit 924, are embodied as machine or computer-readable media that is executable by a processor, such as the processor 908. As described herein and amongst other uses, the machine-readable media facilitates performance of certain operations to enable reception and transmission of data. For example, the machine-readable media may provide an instruction (e.g., command) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus).

In another configuration, the heat treatment circuit 916, the regeneration circuit 920, and the deSOx regeneration circuit 924 may be embodied as one or more circuitry components including, but not limited to, processing circuitry, network interfaces, peripheral devices, input devices, output devices, sensors, etc. In some embodiments, the heat treatment circuit 916, the regeneration circuit 920, and the deSOx regeneration circuit 924 may take the form of one or more analog circuits, electronic circuits (e.g., integrated circuits (IC), discrete circuits, system on a chip (SOCs) circuits, microcontrollers), telecommunication circuits, hybrid circuits, and any other type of circuit. In this regard, the heat treatment circuit 916, the regeneration circuit 920, and the deSOx regeneration circuit 924 may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on). The heat treatment circuit 916, the regeneration circuit 920, and the deSOx regeneration circuit 924 may also include programmable hardware devices such as field programmable gate arrays, programmable array logic, programmable logic devices or the like. The heat treatment circuit 916, the regeneration circuit 920, and the deSOx regeneration circuit 924 may include one or more memory devices for storing instructions that are executable by the processor(s) of the heat treatment circuit 916, the regeneration circuit 920, and the deSOx regeneration circuit 924. The one or more memory devices and processor(s) may have the same definition as provided below with respect to the memory device 912 and the processor 908. In some hardware unit configurations, the heat treatment circuit 916, the regeneration circuit 920, and the deSOx regeneration circuit 924 may be geographically dispersed throughout separate locations in the vehicle. Alternatively and as shown, the heat treatment circuit 916, the regeneration circuit 920, and the deSOx regeneration circuit 924 may be embodied in or within a single unit/housing, which is shown as the controller 14.

In the example shown, the controller 14 includes a processing circuit 904 having the processor 908 and the memory device 912. The processing circuit 904 may be structured or configured to execute or implement the instructions, commands, and/or control processes described herein with respect to the heat treatment circuit 916, the regeneration circuit 920, and the deSOx regeneration circuit 924. The depicted configuration represents the heat treatment circuit 916, the regeneration circuit 920, and the deSOx regeneration circuit 924 as machine or computer-readable media. However, as mentioned above, this illustration is not meant to be limiting as the present disclosure contemplates other embodiments where the heat treatment circuit 916, the regeneration circuit 920, and the deSOx regeneration circuit 924 or at least one circuit of the heat treatment circuit 916, the regeneration circuit 920, and the deSOx regeneration circuit 924 is configured as a hardware unit. All such combinations and variations are intended to fall within the scope of the present disclosure.

The processor 908 may be implemented as one or more general-purpose processor, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the heat treatment circuit 916, the regeneration circuit 920, and the deSOx regeneration circuit 924 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory device 912 (e.g., RAM, ROM, Flash Memory, hard disk storage) may store data and/or computer code for facilitating the various processes described herein. The memory device 912 may be communicably connected to the processor 908 to provide computer code or instructions to the processor 908 for executing at least some of the processes described herein. Moreover, the memory device 912 may be or include tangible, non-transient volatile memory or non-volatile memory. Accordingly, the memory device 912 may include database components, object code components, script components, or any other type of information structure for supporting the various activities and information structures described herein.

The communications interface 928 may include wired or wireless interfaces (e.g., jacks, antennas, transmitters, receivers, transceivers, wire terminals) for conducting data communications with various systems, devices, or networks. For example, the communications interface 928 may include an Ethernet card and port for sending and receiving data via an Ethernet-based communications network and/or a Wi-Fi transceiver for communicating via a wireless communications network. The communications interface 928 may be structured to communicate via local area networks or wide area networks (e.g., the Internet) and may use a variety of communications protocols (e.g., IP, LON, Bluetooth, ZigBee, radio, cellular, near field communication).

The communications interface 928 of the controller 14 may facilitate communication between and among the controller 14 and one or more components of the vehicle 10 (e.g., the engine 18, the exhaust aftertreatment system 22, the NOx sensors 54, 56, the pressure sensor(s) 58, the temperature sensor(s) 59, and the proximity sensor(s) 60). Communication between and among the controller 14 and the components of the vehicle 10 may be via any number of wired or wireless connections (e.g., any standard under IEEE 802). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The heat treatment circuit 916 is structured or configured to receive information indicative of a status of the Cu-zeolite catalyst(s) (e.g., the SCR catalyst 34 and/or the AMOx catalyst 36). For example, the information indicative of the status of the Cu-zeolite catalyst may include information indicating that SCR catalyst 34 and/or the AMOx catalyst 36 has been newly installed (e.g., from an operator of the engine via the operator I/O device 62). In another example, the information indicative of the status of the Cu-zeolite catalyst may include a fault code (e.g., from the regeneration circuit 920 or other vehicle systems) indicating that the SCR catalyst 34 and/or the AMOx catalyst 36 may be degraded. In another example, the information indicative of the status of the Cu-zeolite catalyst may include information indicative of an exhaust outlet NOx concentration sensed by the second NOx sensor 56. The heat treatment circuit 916 is configured to determine, based on the information indicative of the status of the Cu-zeolite catalyst(s) that Cu-zeolite catalysts should receive heat-treatment. In response to determining that the Cu-zeolite catalyst should receive heat-treatment, the heat treatment circuit 916 is configured to command the engine 18 to produce exhaust gas at a predefined heat treatment temperature for a predefined heat treatment time period to heat treat the Cu-zeolite catalyst to convert at least a portion of the ZCuOH active sites into $Z_2$Cu active sites. The heat treatment increases an amount of $Z_2$Cu active sites relative to an amount of ZCuOH active sites in the Cu-zeolite catalyst. The predefined heat treatment temperature is a temperature or range of temperatures high enough to catalyze conversion of ZCuOH active sites into $Z_2$Cu active sites and low enough to reduce a likelihood of heat degradation of the Cu-zeolite catalyst. In embodiments in which the Cu-zeolite catalyst is the SCR catalyst 34, the heat treatment temperature is approximately 500° C. to approximately 700° C. In such embodiments, the heat treatment time period is approximately 1 hour to approximately 100 hours. The heat treatment time period may be approximately 1 hour to 25 hours. In embodiments in which the Cu-zeolite catalyst is the AMOx catalyst 36, the heat treatment temperature is approximately 500° C. to approximately 650° C. In such embodiments, the heat treatment time period is approximately 1 hour to approximately 100 hours. The heat treatment time period may be approximately 1 hour to 25 hours. In either embodiment, higher temperature heat treatment temperatures may be used in shorter heat treatment time periods and lower heat treatment temperatures may be used in longer heat treatment time periods. In some embodiments, the heat treatment circuit 916 may be configured to add water to the exhaust gas to enhance the conversion of ZCuOH active sites into $Z_2Cu$ active sites. In such embodiments, approximately 5 vol. % to approximately 20 vol. % of water may be introduced during heat treatment.

In some embodiments, the heat treatment circuit 916 is configured to receive information indicative of a status of the Cu-zeolite catalyst indicating that a new Cu-zeolite catalyst (e.g., a new SCR catalyst 34 and/or AMOx catalyst 36) has been installed in the exhaust aftertreatment system 22 and that the matting material 52A, 52B has been installed. The information indicating that the new Cu-zeolite catalyst has been installed may include information input by an operator of the engine 18 via the operator I/O device 62, sensed information from the proximity sensor(s) 60 and so on. In embodiments in which one or more external heaters are used to heat the new Cu-zeolite catalyst, the heat treatment circuit 916 is configured to receive information indicating that the external heaters have been positioned proximate the matting material 52A, 52B and the new Cu-zeolite catalyst. The information indicating that the external heaters have been positioned may include information input by an operator of the vehicle 10 via the operator I/O device 62, sensed information from the proximity sensor (s) 60 and so on. In response to receiving the information indicating that the matting material 52A, 52B and the new Cu-zeolite catalyst have been installed in the exhaust aftertreatment system 22, the heat treatment circuit 916 is configured to command the engine 18 to produce exhaust gas at a predefined heat treatment temperature and/or to command the external heaters to heat the matting material 52A, 52B and the new Cu-zeolite catalyst to a predefined heat treatment temperature for a predefined heat treatment time period to heat treat the new Cu-zeolite catalyst to convert at least a portion of the ZCuOH active sites into $Z_2Cu$ active sites. In embodiments in which the heat treatment process is carried out while also heat treating the matting material 52A, 52B, the predefined heat treatment temperature or range of temperatures is high enough and the predefined heat treatment time period is long enough to cause thermal expansion of the matting material 52A, 52B.

Figure 10:
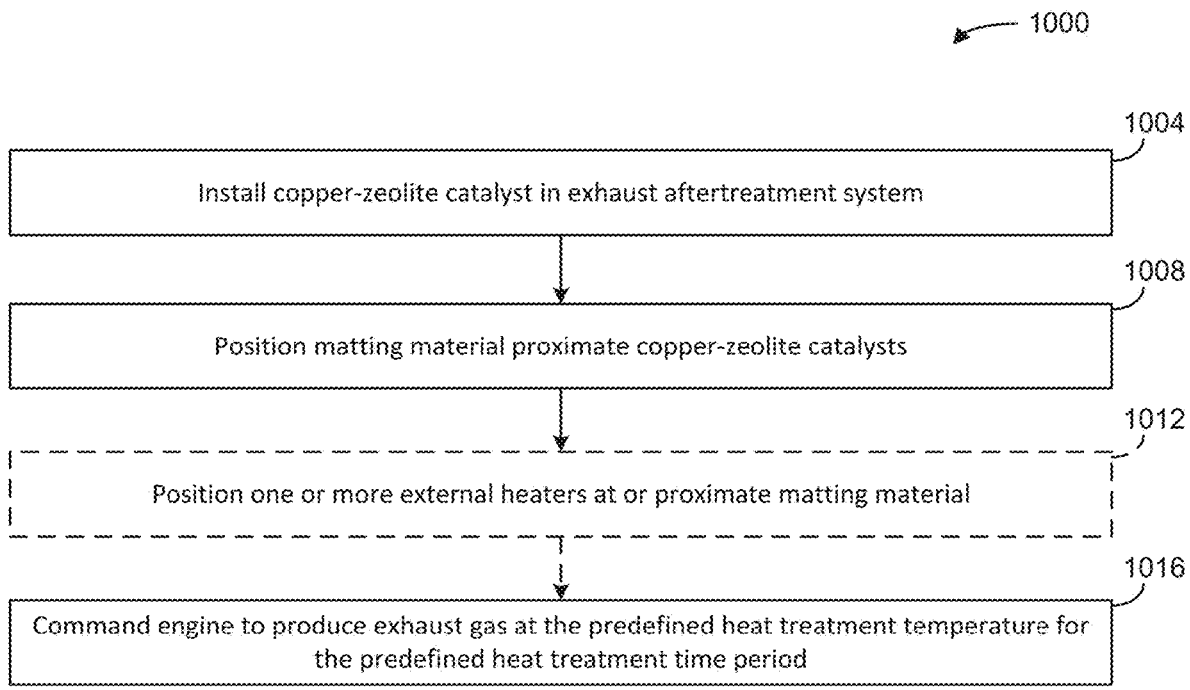
FIG. 10 is a flow diagram of a method for heat treatment of a new copper-zeolite catalyst during a matting installation process.

FIG. 10 illustrates an exemplary method 1000 for heat treatment of a new Cu-zeolite catalyst (e.g., a SCR catalyst 34 and/or an AMOx catalyst 36) during a matting material 52A, 52B installation process. At process 1004, the new Cu-zeolite catalyst is installed in the exhaust aftertreatment system 22. At process 1008, the matting material 52A, 52B is positioned proximate the Cu-zeolite catalyst. At optional process 1012, an operator may position one or more external heaters at or proximate the matting material 52A, 52B. At process 1016, the heat treatment circuit 916 commands the engine 18 to produce exhaust gas at the predefined heat treatment temperature and/or commands the external heater to heat the matting material 52A, 52B and the Cu-zeolite catalyst to the predefined heat treatment temperature for the predefined heat treatment time period. In some embodiments, the heat treatment circuit 916 may introduce approximately 5 vol. % to approximately 20 vol. % of water to the Cu-zeolite catalyst during process 1016.

In some embodiments, the heat treatment circuit 916 is configured to receive status information indicating that a new Cu-zeolite catalyst (e.g., SCR catalyst 34 and/or AMOx catalyst 36) has been installed in the exhaust aftertreatment system 22. For example, information indicating that the new Cu-zeolite catalyst has been installed in the exhaust aftertreatment system 22 may include information input by an operator of the engine 18 via the operator I/O device 62, information from the proximity sensor(s) 60 positioned at or proximate a catalyst site in the exhaust aftertreatment system 22, and so on. The heat treatment circuit 916 is configured to determine that a current engine operation event is the first time the engine 18 has been operated since the new Cu-zeolite catalyst has been installed in the exhaust aftertreatment system 22 based on the information indicating that the new Cu-zeolite catalyst has been installed in the exhaust aftertreatment system 22. In response to determining that the engine operation event is a first engine operation event since the new Cu-zeolite catalyst has been installed in the exhaust aftertreatment system 22, the heat treatment circuit 916 is configured to command the engine 18 to produce exhaust gas at the predefined heat treatment temperature to heat the new Cu-zeolite to the predefined heat treatment temperature for the predefined heat treatment time period to heat treat the new Cu-zeolite to convert at least a portion of the ZCuOH active sites into $Z_2Cu$ active sites.

Figure 11:
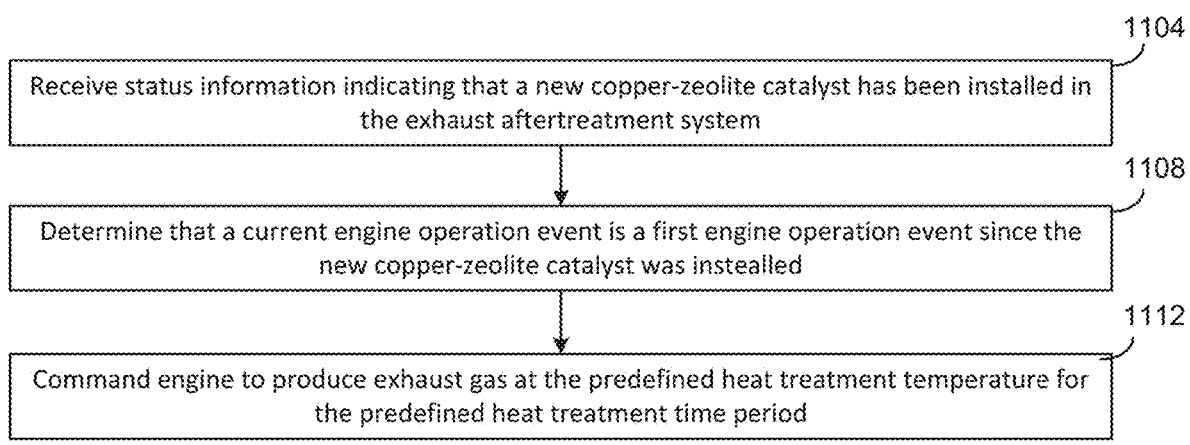
FIG. 11 is a flow diagram of a method for heat treating a copper-zeolite catalyst during a first engine operation event after the copper-zeolite catalyst has been installed in the exhaust aftertreatment system of FIG. 5.

FIG. 11 illustrates an exemplary method 1100 for heat treating a Cu-zeolite catalyst (e.g., SCR catalyst 34 and/or AMOx catalyst 36) during a first engine operation event after the Cu-zeolite catalyst has been installed in the exhaust aftertreatment system 22. At process 1104, the heat treatment circuit 916 receives status information indicating that a new Cu-zeolite catalyst has been installed in the exhaust aftertreatment system 22. At process 1108, the heat treatment circuit 916 determines that a current engine operation event is the first time the engine 18 has been operated since the new Cu-zeolite catalyst has been installed in the exhaust aftertreatment system 22. At process 1112, the heat treatment circuit 916 commands the engine 18 to produce exhaust gas at the predefined heat treatment temperature to heat the Cu-zeolite catalyst to the predefined heat treatment temperature for the predefined heat treatment time period to heat treat the new Cu-zeolite catalyst to convert at least a portion of the ZCuOH active sites into $Z_2Cu$ active sites.

The regeneration circuit 920 is configured to determine, based on information indicative of a status of the DPF 30, whether the DPF 30 is in need of regeneration. For example, the regeneration circuit 920 may receive information indicative of a pressure across the DPF 30 from the one or more pressure sensors 58. The regeneration circuit 920 is configured to command the engine 18 to produce exhaust at a predefined DPF regeneration temperature for a predefined DPF regeneration time period to burn ash, soot, and other contaminates off of the DPF 30. In some embodiments, the DPF regeneration temperature may be approximately 500° C. to approximately 575° C. In some embodiments, the regeneration circuit 920 is configured to receive information indicative of a health of the SCR catalyst 34. For example, the regeneration circuit 920 may receive information indicative of a NOx concentration upstream of the SCR catalyst 34 from the first NOx sensor 54 positioned at or proximate an inlet of the exhaust aftertreatment system 22 and may receive information indicative of a NOx concentration downstream of the SCR catalyst 34 from the second NOx sensor 56 positioned at or proximate an outlet of the exhaust aftertreatment system 22. The regeneration circuit 920 may determine a difference between the information indicative of the NOx concentration upstream of the SCR catalyst 34 and the information indicative of the NOx concentration downstream of the SCR catalyst 34 and compare the difference to a difference threshold. The regeneration circuit 920 may determine, based on the difference being greater than the difference threshold, that the SCR catalyst 34 likely requires regeneration. The regeneration circuit 920 may be configured to set a fault code indicating that the NOx concentration downstream of the SCR catalyst 34 is above the difference threshold. The regeneration circuit 920 is configured to command the engine 18 to produce exhaust at a predefined SCR catalyst regeneration temperature for a predefined SCR catalyst regeneration time period to burn ash, soot, and other contaminates off of the SCR catalyst 34.

The desulfation "deSOx" regeneration circuit 924 is configured to conduct a desulfation regeneration ("deSOx regeneration") process to remove sulfur bound to the ZCuOH and $Z_2Cu$ active sites of the Cu-zeolite catalysts of the exhaust aftertreatment system 22. The deSOx regeneration process enacted by the deSOx regeneration circuit 924 is distinct from the regeneration process enacted by the regeneration circuit 920. For example, the deSOx regeneration is often conducted at higher temperatures that the regeneration process enacted by the regeneration circuit 920. In some embodiments, the deSOx regeneration circuit 924 identifies a predicted sulfur exposure of the Cu-zeolite catalysts and determines whether to conduct the deSOx regeneration process based on the predicted sulfur exposure of the Cu-zeolite catalysts. In other embodiments, the deSOx regeneration circuit 924 identifies fault codes indicating that the Cu-zeolite catalysts likely need regeneration.

The deSOx regeneration circuit 924 is configured to determine a status of the Cu-zeolite catalysts. Exemplary statuses of the Cu-zeolite catalysts include likely does not need deSOx regeneration and likely in need of deSOx regeneration. For example, in some embodiments, the deSOx regeneration circuit 924 is configured to predict a sulfur exposure of the Cu-zeolite catalysts. As used herein, the phrase "sulfur exposure" refers to an amount of sulfur that the Cu-zeolite catalysts have been exposed to since a last deSOx regeneration or, for newly-installed Cu-zeolite catalysts, since installation of the Cu-zeolite catalysts. In such an embodiment, the deSOx regeneration circuit 924 be configured to may predict the sulfur exposure of the Cu-zeolite catalysts. For example, the deSOx regeneration circuit 924 may input one or more of an amount of fuel combusted since a last deSOx regeneration and/or since the Cu-zeolite catalyst was installed, a type of fuel combusted, a distance traveled since the last deSOx regeneration, an amount of engine operating hours since the last deSOx regeneration, an amount of engine oil consumed, and so on to a mathematical model, a look-up table, and/or an algorithm. In some embodiments, the amount of engine oil consumed can be determined based on ash adjust values. The deSOx regeneration circuit 924 is configured to compare the predicted sulfur exposure to a predefined sulfur exposure threshold. The predefined sulfur exposure threshold is an amount or range of amounts of sulfur exposure at or above which the Cu-zeolite catalysts likely require regeneration. For example, the predefined sulfur exposure threshold can be an amount of sulfur that has been present in the exhaust gas for a predefined time period. In some embodiments, the predefined sulfur exposure threshold can be approximately 1 gram of sulfur per liter of exhaust (gS/L) to approximately 15 gS/L. In some embodiments, the predefined sulfur exposure threshold can be approximately 2.5 gS/L to approximately 5.0 gS/L.

In some embodiments, the deSOx regeneration circuit 924 is configured to determine a status of the Cu-zeolite catalysts based on the comparison. For example, in response to the comparison indicating that the predicted sulfur exposure of the Cu-zeolite catalysts is below the predefined sulfur exposure threshold, the deSOx regeneration circuit 924 is configured to determine that the Cu-zeolite catalysts have a status of "does not require deSOx regeneration." In response to determining that the predicted sulfur exposure of the Cu-zeolite catalysts is at or above the predefined sulfur exposure threshold, the deSOx regeneration circuit 924 is configured to determine that the Cu-zeolite catalysts have a status of "in need of deSOx regeneration." In some embodiments, the deSOx regeneration circuit 924 is configured to set a fault code in response to determining that the Cu-zeolite catalyst have a status of "in need of deSOx regeneration." In response to determining that the sulfur exposure of the Cu-zeolite catalysts is at or above the predefined sulfur exposure threshold, the regeneration circuit 920 determines that the Cu-zeolite catalysts are in need of a regeneration.

In some embodiments, the deSOx regeneration circuit 924 is configured to determine the status of the Cu-zeolite catalysts based on one or more faults indicative of a high NOx in the exhaust leaving the exhaust aftertreatment system 22. For example, the deSOx regeneration circuit 924 may be configured to receive the fault set by the regeneration circuit 920 that is indicative of a high NOx concentration downstream of the Cu-zeolite catalysts.

In some embodiments, in response to determining that the Cu-zeolite catalysts are in need of regeneration, the deSOx regeneration circuit 924 is configured to command the reductant dosers 40 to increase reductant dosing. Increasing an amount of reductant in the exhaust gas may increase an efficiency of sulfur removal from the Cu-zeolite catalysts. In some embodiments, the deSOx regeneration circuit 924 is configured to command the reductant dosers 40 to increase reductant dosing so that an ammonia-to-NOx (ANR) ratio of the exhaust gas in the exhaust aftertreatment system 22 is greater than 1.

The deSOx regeneration circuit 924 is configured to command the engine 18 to produce exhaust gas at a predefined deSOx regeneration temperature for a predefined deSOx regeneration time period to cause at least a portion of the $Z_2OH$ active sites and ZCuOH active sites of the Cu-zeolite catalyst to release bound sulfur. For example, the deSOx regeneration circuit 924 may change the speed and torque of the engine 18 until a temperature of the exhaust gas produced by the engine 18 is at or above the predefined deSOx regeneration temperature. The predefined deSOX regeneration temperature is a temperature or range of temperatures high enough to cause the ZCuOH active sites and $Z_2Cu$ active sites of the Cu-zeolite catalyst to release bound sulfur, and low enough to reduce a likelihood of heat degradation of the Cu-zeolite catalyst. The deSOx regeneration temperature may also cause a portion of ZCuoH active sites to transform into $Z_2Cu$ active sites. In some embodiments, the deSOx regeneration temperature is approximately 500° C. to approximately 650° C. In some embodiments, the deSOx regeneration temperature is approximately 550° C. to 625° C. The deSOx regeneration time period is approximately 5 minutes to approximately 60 minutes and is determined based on the deSOx regeneration temperature. For example, in some embodiments, the deSOx regeneration temperature may be approximately 600° C. and the deSOx regeneration time period may be approximately 10 minutes to approximately 15 minutes. In another example, the deSOx regeneration temperature may be approximately 550° C. and the deSOx regeneration time period may be approximately 15 minutes to approximately 30 minutes. The deSOx regeneration circuit 924 is configured to start a timer at an initiation of the deSOx regeneration and stop the deSOx regeneration when the timer indicates that the deSOx regeneration has lasted for the predefined time period. In some embodiments, the deSOx regeneration circuit 924 may be configured to start the timer when a temperature of the exhaust gas (after the engine 18 has been commanded to increase temperature of the exhaust gas) has increased by a predefined amount (relative to the temperature of the exhaust gas before the engine 18 has been commanded to increase the temperature of the exhaust gas). In some embodiments, the predefined amount may be approximately 0° C. to approximately 50° C.

Figure 12:
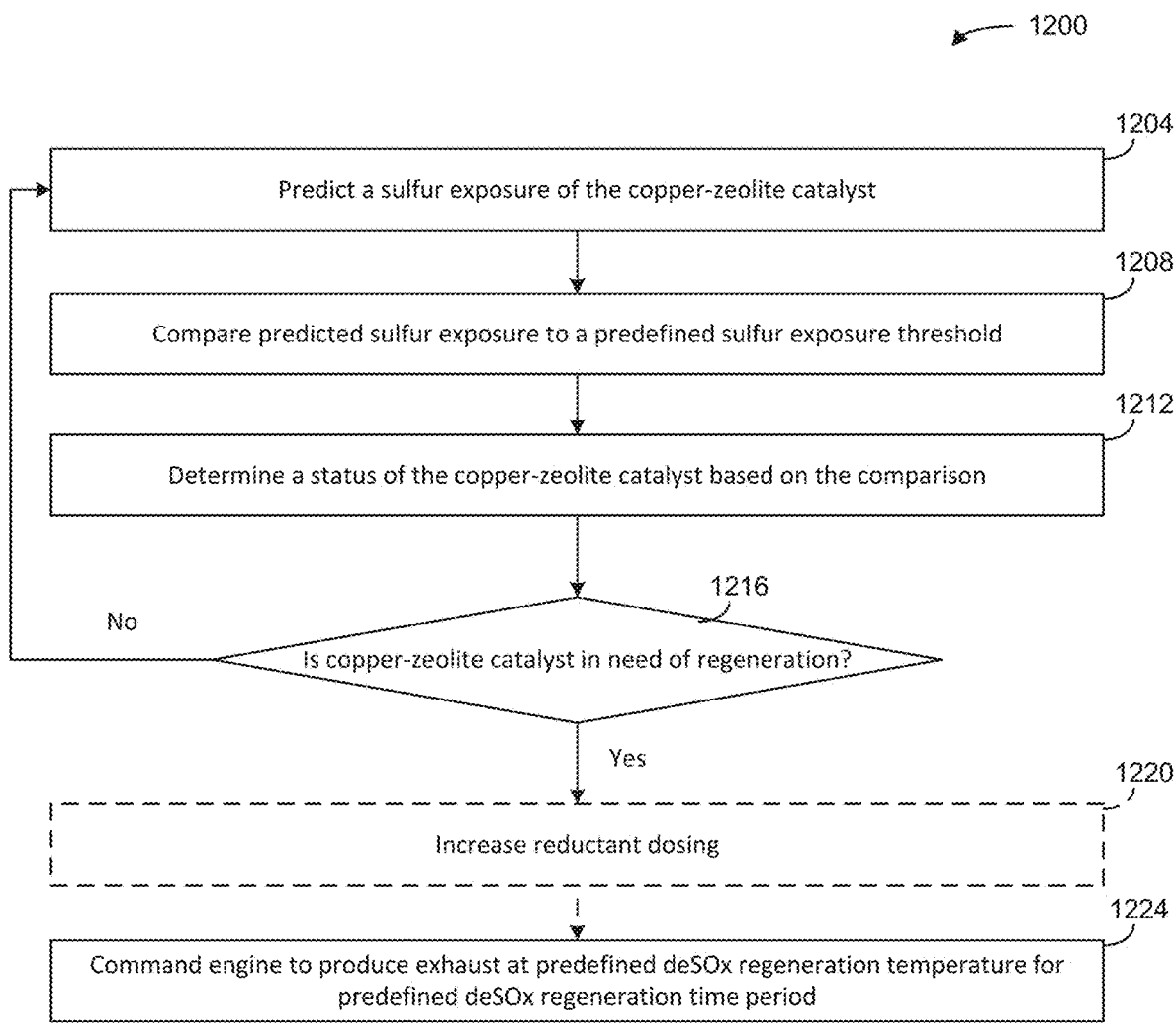
FIG. 12 is a flow diagram of a method for conducting a desulfation regeneration of copper-zeolite catalysts.

FIG. 12 illustrates a method 1200 for conducting a deSOx regeneration of the Cu-zeolite catalysts (such as the SCR catalyst 34 and the AMOx catalyst 36) according to an exemplary embodiment. At process 1204, the deSOx regeneration circuit 924 predicts a sulfur exposure of the Cu-zeolite catalysts and determines the status of the Cu-zeolite catalysts based on the predicted sulfur exposure. For example, the deSOx regeneration circuit 924 may predict the sulfur exposure of the Cu-zeolite catalysts by inputting one or more of an amount of fuel combusted since a last deSOx regeneration and/or since the Cu-zeolite catalyst was installed, a type of fuel combusted, a distance traveled since the last deSOx regeneration, engine operating hours since the last deSOx regeneration, an amount of engine oil consumed, and so on to a mathematical model, a look-up table, and/or an algorithm. In some embodiments, the deSOx regeneration circuit 924 may determine the amount of engine oil consumed based on ash adjust values.

At process 1208, the deSOx regeneration circuit 924 compares the predicted sulfur exposure to a predefined sulfur exposure threshold. The predefined sulfur exposure threshold is an amount or range of amounts of sulfur exposure at or above which the Cu-zeolite catalysts likely require regeneration. For example, the predefined sulfur exposure threshold can be an amount of sulfur that has been present in the exhaust gas for a predefined time period. In some embodiments, the predefined sulfur exposure threshold can be from about 1 grams of sulfur per liter of exhaust (gS/L) to 15 gS/L. In some embodiments, the predefined sulfur exposure threshold can be from 2.5 gS/L to 5.0 gS/L.

At process 1212, the deSOx regeneration circuit 924 determines a status of the Cu-zeolite catalysts based on the comparison. For example, in response to the comparison indicating that the predicted sulfur exposure of the Cu-zeolite catalysts is below the predefined sulfur exposure threshold, the deSOx regeneration circuit 924 determines that the Cu-zeolite catalysts have a status of "not in need of deSOx regeneration." In response to determining that the predicted sulfur exposure of the Cu-zeolite catalysts is at or above the predefined sulfur exposure threshold, the deSOx regeneration circuit 924 determines that the Cu-zeolite catalysts have a status of "in need of deSOx regeneration." In some embodiments, the deSOx regeneration circuit 924 may set a fault code in response to determining that the Cu-zeolite catalyst have a status of "in need of deSOx regeneration."

At process 1216, in response to determining that the sulfur exposure of the Cu-zeolite catalysts is at or above the predefined sulfur exposure threshold, the deSOx regeneration circuit 924 determines that the Cu-zeolite catalysts are in need of a regeneration. At process 1220, the deSOx regeneration circuit 924 may command the reductant dosers 40 to increase reductant dosing. In some embodiments, the deSOx regeneration circuit 924 commands the reductant dosers 40 to increase reductant dosing so that an ammonia-to-NOx (ANR) ratio of the exhaust gas in the exhaust aftertreatment system 22 is greater than 1.

At process 1224, the deSOx regeneration circuit 924 commands the engine 18 to produce exhaust gas at a predefined deSOx regeneration temperature for a predefined deSOx regeneration time period to cause at least a portion of the $Z_2OH$ active sites and ZCuOH active sites of the Cu-zeolite catalyst to release bound sulfur. In some embodiments, the deSOx regeneration temperature is approximately 500° C. to approximately 650° C. In some embodiments, the deSOx regeneration temperature is approximately 550° C. to 625° C. The deSOx regeneration time period is approximately 5 minutes to approximately 60 minutes and is determined based on the deSOx regeneration temperature. The deSOx regeneration circuit 924 may start a timer at an initiation of the deSOx regeneration and stop the deSOx regeneration when the timer indicates that the deSOx regeneration has lasted for the predefined time period. In some embodiments, the deSOx regeneration circuit 924 may start the timer when a temperature of the exhaust gas has increased a by predefined amount. In some embodiments, the predefined amount can be approximately 0° C. to approximately 50° C.

Figure 13:
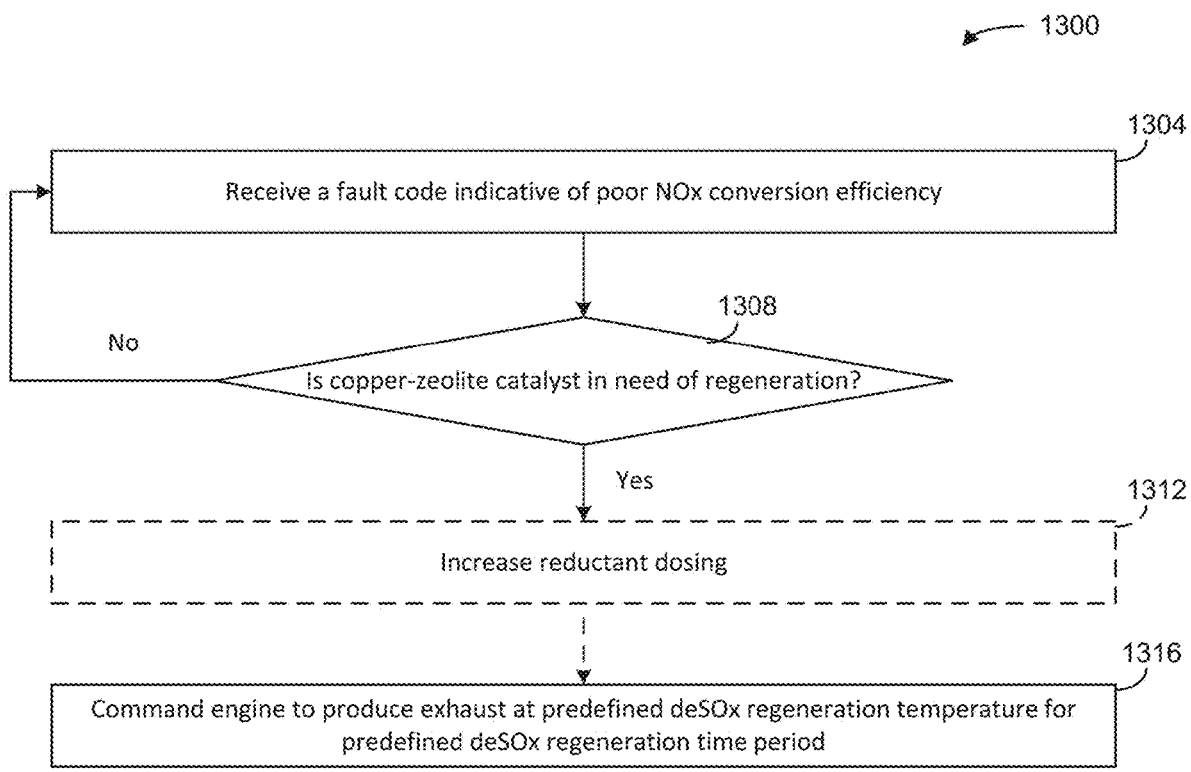
FIG. 13 is a flow diagram of another method for conducting a desulfation regeneration of copper-zeolite catalysts.

FIG. 13 illustrates a method 1300 for conducting a deSOx regeneration of the Cu-zeolite catalysts according to an exemplary embodiment. At process 1304, the deSOx regeneration circuit 924 receives a fault code indicative of poor NOx conversion efficiency. For example, the deSOx regeneration circuit 924 may determine that the fault code indicative of poor NOx conversion indicates that one or more of the Cu-zeolite catalysts is likely in need of deSOx regeneration.

At process 1308, in response to receiving the fault code indicative of poor NOx conversion efficiency, the deSOx regeneration circuit 924 determines that the Cu-zeolite catalysts are in need of deSOx regeneration. At process 1312, the deSOx regeneration circuit 924 may command the reductant dosers 40 to increase reductant dosing. In some embodiments, the deSOx regeneration circuit 924 commands the reductant dosers 40 to increase reductant dosing so that an ammonia-to-NOx (ANR) ratio of the exhaust gas in the exhaust aftertreatment system 22 is greater than 1.

At process 1316, the deSOx regeneration circuit 924 commands the engine 18 to produce exhaust gas at a predefined deSOx regeneration temperature for a predefined deSOx regeneration time period to cause at least a portion of the $Z_2OH$ active sites and ZCuOH active sites of the Cu-zeolite catalyst to release bound sulfur. In some embodiments, the deSOx regeneration temperature is approximately 500° C. to approximately 650° C. In some embodiments, the deSOx regeneration temperature is approximately 550° C. to 625° C. The deSOx regeneration time period is approximately 5 minutes to approximately 60 minutes and is determined based on the deSOx regeneration temperature. At process 1928, the deSOx regeneration circuit 924 may start a timer at an initiation of the deSOx regeneration and stop the deSOx regeneration when the timer indicates that the deSOx regeneration has lasted for the predefined time period. In some embodiments, the deSOx regeneration circuit 924 may start the timer when a temperature of the exhaust gas has increased a by predefined amount. In some embodiments, the predefined amount can be approximately 0° C. to approximately 50° C.

No claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that circuit A communicates directly with circuit B (i.e., no intermediary) or communicates indirectly with circuit B (e.g., through one or more intermediaries).

While various circuits with particular functionality are shown in FIG. 9 it should be understood that the controller 14 may include any number of circuits for completing the functions described herein. For example, the activities and functionalities of the circuits 916-924 may be combined in multiple circuits or as a single circuit. Additional circuits with additional functionality may also be included. Further, the controller 14 may further control other activity beyond the scope of the present disclosure.

As mentioned above and in one configuration, the "circuits" may be implemented in machine-readable medium for execution by various types of processors, such as the processor 908 of FIG. 9. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method, comprising:
predicting a sulfur exposure of one or more copper-zeolite catalysts deployed in an exhaust aftertreatment system;
comparing the predicted sulfur exposure to a predefined sulfur exposure threshold, the predefined sulfur exposure threshold being an amount of sulfur present in the exhaust gas for a first predefined time period, wherein the predefined sulfur exposure threshold is greater than 1 gram of sulfur per liter of exhaust gas (gS/L);
receiving a fault code indicating that a NOx amount in exhaust gas leaving the exhaust aftertreatment system is above a predefined high NOx amount threshold;
in response to the comparison indicating that the predicted sulfur exposure of the one or more copper-zeolite catalysts is at or above the predefined sulfur exposure threshold and receiving the fault code, heating the one or more copper-zeolite catalysts to a predefined heat treatment temperature to desulfate the one or more copper-zeolite catalysts;
starting a timer in response to a temperature of the heated one or more copper-zeolite catalysts increasing by a predefined amount; and
stopping the heating of the one or more copper-zeolite catalysts based on the timer indicating that a second predefined time period has elapsed, wherein the second predefined time period is based on the predefined heat treatment temperature.

2. The method of claim 1, wherein predicting the sulfur exposure is based on at least one of an amount of fuel combusted by an engine coupled to the exhaust aftertreatment system since a last desulfation regeneration, an amount of fuel combusted by the engine since the copper-zeolite catalyst was installed in the exhaust aftertreatment system, a type of fuel combusted by the engine, a distance traveled by a vehicle with the engine since the last desulfation regeneration, an amount of operating hours since the last desulfation regeneration of the engine, or an amount of oil consumed by the engine.

3. The method of claim 1, wherein the predefined heat treatment temperature is a range of approximately 500° C. to 700° C.

4. The method of claim 1, further comprising determining a status of the one or more copper-zeolite catalysts based on the comparison of the predicted sulfur exposure to the predefined sulfur exposure threshold.

5. The method of claim 1, further comprising, in response to the comparison indicating that the predicted sulfur exposure of the one or more copper-zeolite catalysts is below the predefined sulfur exposure threshold, bypassing a desulfation regeneration event for the one or more copper zeolite catalysts.

6. The method of claim 1, further comprising, in response to the comparison indicating that the predicted sulfur exposure of the one or more copper-zeolite catalysts is at or above the predefined sulfur exposure threshold, initiating a desulfation regeneration event.

7. The method of claim 6, further comprising, in response to initiating the desulfation regeneration event, setting a desulfation fault code indicating that the predicted sulfur exposure of the one or more copper-zeolite catalysts is at or above the predefined sulfur exposure threshold.

8. The method of claim 6, further comprising, in response to initiating the desulfation regeneration event, causing a reductant doser to increase reductant dosing relative to an immediately prior reductant dosing amount before the causing of the reductant doser to increase reductant dosing.

9. The method of claim 6, further comprising starting the timer at an initiation of the desulfation regeneration event and stopping the desulfation regeneration event based on the timer indicating that the desulfation regeneration event duration is at or above the second predefined time period.

10. The method of claim 1, wherein the predefined amount is between 0 degrees Celsius and 50 degrees Celsius.

\* \* \* \* \*